United States Patent
Iida

(10) Patent No.: US 11,971,295 B2
(45) Date of Patent: Apr. 30, 2024

(54) AUTOMATIC ANALYZING APPARATUS AND JIG

(71) Applicant: Canon Medical Systems Corporation, Otawara (JP)

(72) Inventor: Shin Iida, Tokyo (JP)

(73) Assignee: Canon Medical Systems Corporation, Otawara (JP)

( * ) Notice: Subject to any disclaimer, the term of this patent is extended or adjusted under 35 U.S.C. 154(b) by 89 days.

(21) Appl. No.: 17/449,309

(22) Filed: Sep. 29, 2021

(65) Prior Publication Data

US 2022/0099482 A1 Mar. 31, 2022

(30) Foreign Application Priority Data

Sep. 30, 2020 (JP) .................... 2020-165972

(51) Int. Cl.
 *G01J 1/02* (2006.01)
 *G01J 1/04* (2006.01)
 (Continued)

(52) U.S. Cl.
 CPC .......... *G01J 1/0228* (2013.01); *G01J 1/0219* (2013.01); *G01J 1/0223* (2013.01); *G01J 1/0411* (2013.01);
 (Continued)

(58) Field of Classification Search
 CPC .......... G01J 3/44; G01J 1/0228; G01J 1/0223; G01J 1/0411; G01J 1/0219; G01J 21/13;
 (Continued)

(56) References Cited

U.S. PATENT DOCUMENTS 4,090,848 A * 5/1978 Naono .................... G01N 35/00
356/246
4,234,538 A * 11/1980 Ginsberg ............. G01N 21/253
250/226

(Continued)

FOREIGN PATENT DOCUMENTS

JP 05-280851 A 10/1993
JP WO 2007/135922 * 11/2007

(Continued)

OTHER PUBLICATIONS

Office Action mailed Jan. 30, 2024, in corresponding Japanese Patent Application No. 2020-165972, citing document 15 herein, 4 pages.

*Primary Examiner* — Hoa Q Pham
(74) *Attorney, Agent, or Firm* — Oblon, McClelland, Maier & Neustadt, L.L.P.

(57) ABSTRACT

According to one embodiment, an automatic analyzing apparatus includes: a holder including a plurality of placement portions for a reaction tube to be placed thereon; a photometry unit for performing photometry on a solution inside the reaction tube, the photometry unit including a plurality of light emitters and a plurality of first light receivers respectively disposed in the plurality of placement portions; and processing circuitry configured to adjust quantities of light of the plurality of light emitters based on a light quantity signal from a second light receiver that receives light generated by the light emitters and guided by jig inserted into the placement portions.

11 Claims, 9 Drawing Sheets

(51) Int. Cl.
  *G01N 21/13* (2006.01)
  *G01N 35/02* (2006.01)
  *G01J 1/44* (2006.01)
  *G01N 35/00* (2006.01)

(52) U.S. Cl.
  CPC ........... *G01N 21/13* (2013.01); *G01N 35/026* (2013.01); *G01J 2001/4413* (2013.01); *G01N 2035/00346* (2013.01)

(58) Field of Classification Search
  CPC ...... G01N 21/07; G01N 21/35; G01N 35/026; G01N 35/025; G01N 35/00069; G01N 35/00693; G01N 2021/5973; G01N 15/0205; G01N 2201/0415; B01L 2300/0803
  USPC ...... 356/244, 246, 432–440; 436/69, 47, 43; 422/63, 64, 82.05, 552, 83
  See application file for complete search history.

(56) References Cited

U.S. PATENT DOCUMENTS

| | | | |
|---|---|---|---|
| 9,194,793 B2* | 11/2015 | Adachi | G01N 21/253 |
| 2014/0199772 A1* | 7/2014 | Kiss | G01N 35/10 422/63 |
| 2022/0283080 A1* | 9/2022 | Iida | G01N 21/272 |

FOREIGN PATENT DOCUMENTS

| | | | |
|---|---|---|---|
| JP | 2013-250218 A | 12/2013 | |
| JP | 6208356 B2 | 10/2017 | |

* cited by examiner

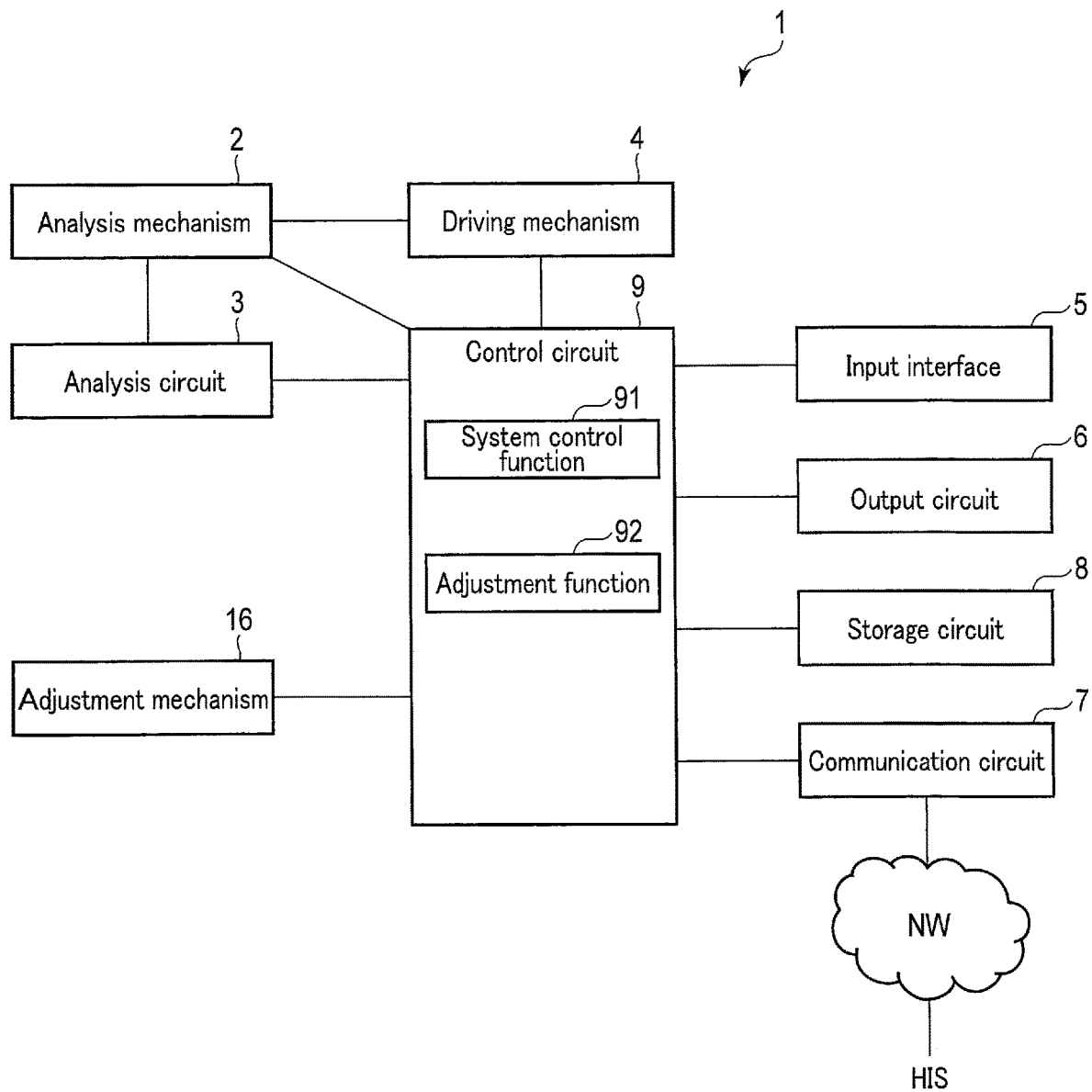
F I G. 1

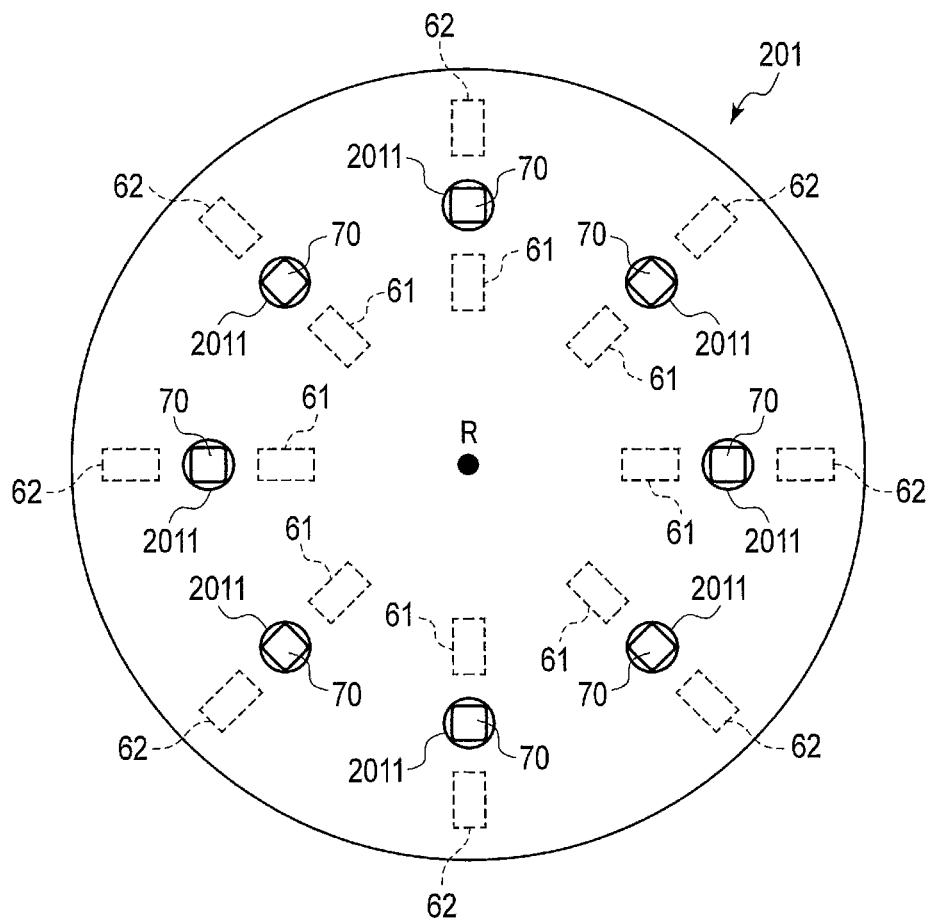
F I G. 3
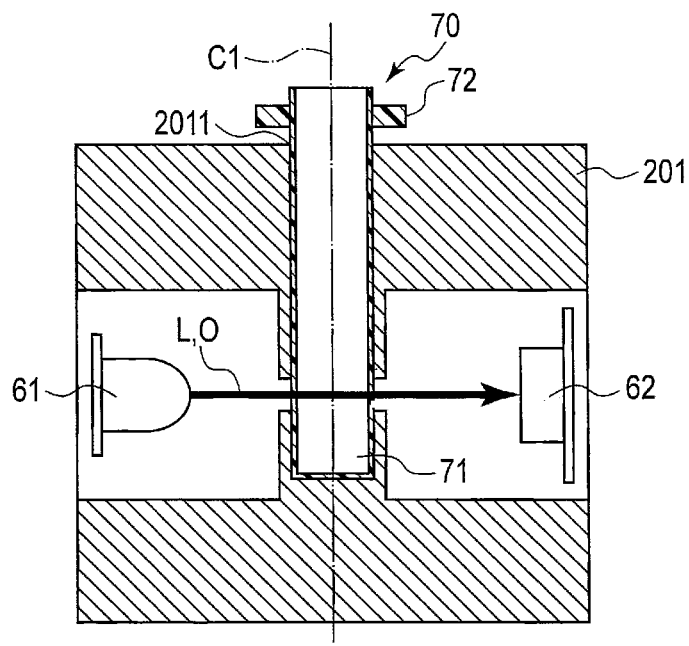
F I G. 4

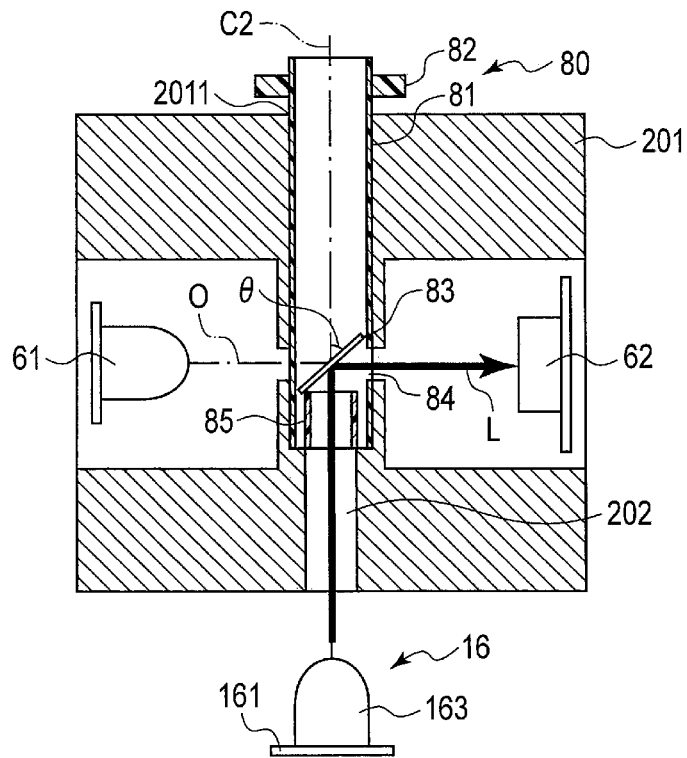
F I G. 13
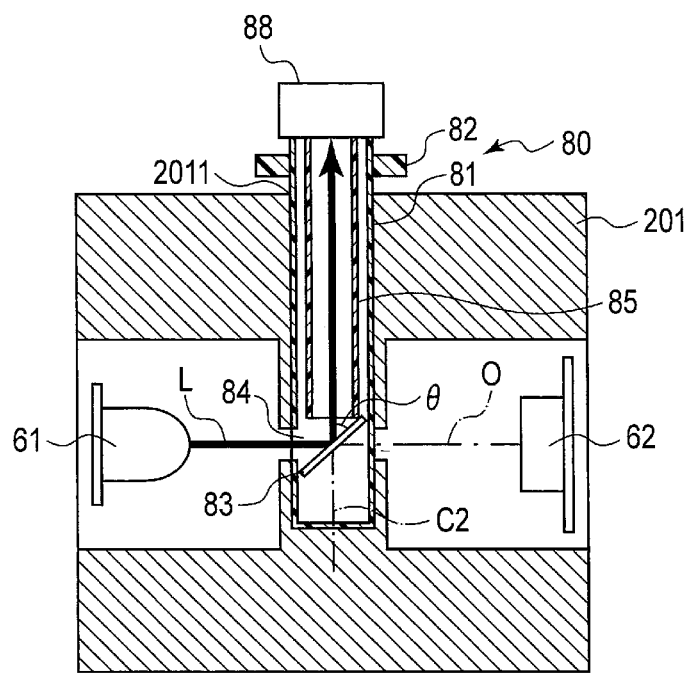
F I G. 14

AUTOMATIC ANALYZING APPARATUS AND JIG

CROSS-REFERENCE TO RELATED APPLICATIONS

This application is based upon and claims the benefit of priority from Japanese Patent Application No. 2020-165972, filed Sep. 30, 2020, the entire contents of which are incorporated herein by reference.

FIELD

Embodiments described herein relate generally to an automatic analyzing apparatus and a jig.

BACKGROUND

With an automatic analyzing apparatus for clinical examination, a certain amount of a biological specimen (hereinafter, simply referred to as a "specimen") such as blood, urine, etc., and a certain amount of a reagent are mixed and reacted in a cuvette inserted in a reaction disk, thereby measuring a quantity of transmitted light or scattered light acquired by irradiating this mixed solution with light. In this manner, a concentration of a substance to be measured, an activity value, a time required for change, etc., are determined. Due to age deterioration of a photometry unit, a quantity of light and a gain need to be adjusted. In the case of manually adjusting a quantity of light and a gain, adjustment of a quantity of light and a gain of the photometry unit takes time.

Furthermore, coagulation measurement using an automatic analyzing apparatus requires one photometry unit for one sample for the convenience of photometric time. Therefore, handling a plurality of samples at the same time requires the same number of photometry units as the number of samples. To ensure the measurement accuracy, it is necessary with this type of automatic analyzing apparatus to calibrate photometry units by adjusting a quantity of light and a gain for each of the photometry units at the time of shipment of the apparatus. Therefore, as the number of photometry units increases, it becomes more difficult to adjust a quantity of light and a gain, and a time required for the adjustment increases. Furthermore, as the number of photometry units increases, it becomes more difficult to perform stable adjustments as a system.

BRIEF DESCRIPTION OF THE DRAWINGS

FIG. 1 is a block diagram showing a function configuration of an automatic analyzing apparatus according to a first embodiment.

FIG. 3 is a schematic view of a holder as viewed from above in a state in which reaction tubes are held by the holder of the automatic analyzing apparatus according to the first embodiment.

FIG. 4 is a sectional view showing a state in which the reaction tube is held by the holder of the automatic analyzing apparatus according to the first embodiment.

FIG. 13 is a sectional view showing a state in which a jig is held by a holder of an automatic analyzing apparatus according to a modification of the second embodiment.

FIG. 14 is a sectional view showing a state in which a jig is held by a holder of an automatic analyzing apparatus according to a third embodiment.

DETAILED DESCRIPTION

Figure 2:
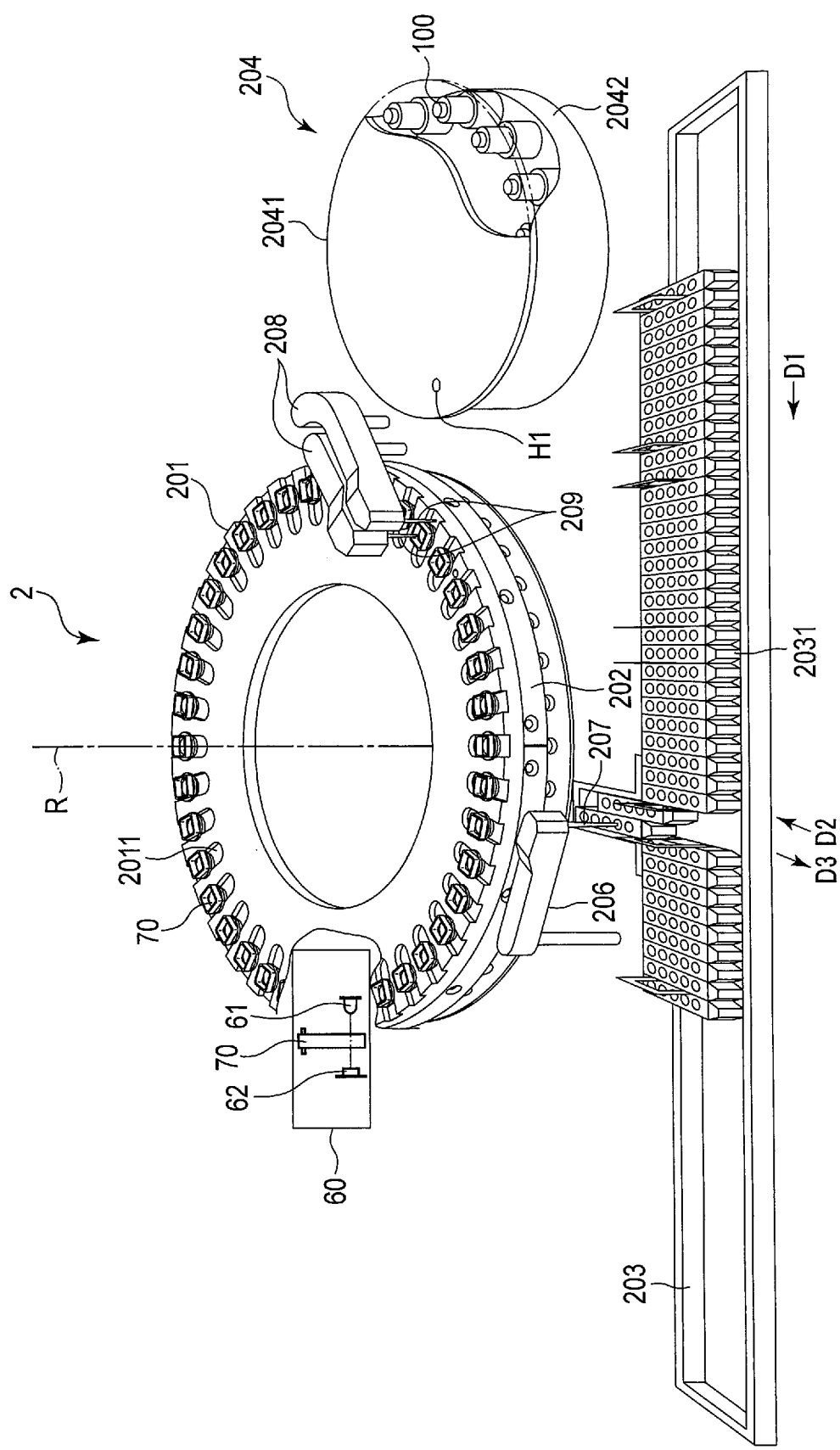
FIG. 2 is a schematic diagram showing an example of a configuration of the automatic analyzing apparatus according to the first embodiment.

According to one embodiment, an automatic analyzing apparatus includes a holder, a photometry unit for performing photometry on a solution inside the reaction tube, and processing circuitry. A holder includes a plurality of placement portions for a reaction tube to be placed thereon. A photometry unit includes a plurality of light emitters and a plurality of first light receivers respectively disposed in the plurality of placement portions. Processing circuitry is configured to adjust quantities of light of the plurality of light emitters based on a light quantity signal from a second light receiver that receives light generated by the light emitters and guided by jig inserted into the placement portions.

First Embodiment

FIG. 1 is a block diagram showing a function configuration of an automatic analyzing apparatus 1 according to a first embodiment. The automatic analyzing apparatus 1 measures an index relating to a reaction between a specimen inserted into a reaction tube and a reagent, and calculates a physical property value of the specimen based on the measured index.

The automatic analyzing apparatus 1 includes an analysis mechanism 2, an analysis circuit 3, a driving mechanism 4, an input interface 5, an output interface 6, a communication interface 7, a storage circuit 8, a control circuit 9, and an adjustment mechanism 16.

The analysis mechanism 2 supports a reaction tube that holds a mixed solution of a specimen and a reagent, and measures an index relating to the mixed solution inside the reaction tube. Hereinafter, an example in which a cuvette 70 is used as a reaction tube will be described. Examples of an index related to a mixed solution include a physical property value of a specimen. The analysis mechanism 2 mixes a specimen such as blood, urine, or the like with a reagent used in each inspection item. Depending on the inspection item, the analysis mechanism 2 mixes a standard solution diluted at a predetermined magnification with a reagent used for the inspection item. The analysis mechanism 2 sequentially measures optical property values of the mixed solution of the specimen or the standard solution and the reagent. Through this measurement, standard data and inspection target data represented by, for example, the transmitted light intensity or absorbance and the scattered light intensity are generated. The analysis mechanism 2 is one example of an analysis portion.

The analysis circuit 3 is a processor that generates calibration data and analysis data by analyzing the standard data and the inspection target data generated by the analysis mechanism 2. The analysis circuit 3 reads an analysis program from the storage circuit 8, for example, and analyzes the standard data and the inspection target data in accordance with the read analysis program. The analysis circuit 3 may include a storage area that stores at least some of the data stored in the storage circuit 8.

The driving mechanism 4 drives the analysis mechanism 2 under the control of the control circuit 9. The driving mechanism 4 is implemented by, for example, a gear, a stepping motor, a belt conveyor, and a lead screw.

The input interface 5 accepts, for example, setting of analysis parameters and the like for each inspection item relating to a specimen for which a measurement instruction has been made by the operator, or a specimen for which a measurement request has been made via an in-hospital network NW. The input interface 5 is implemented by, for example, a mouse, a keyboard, and a touch pad to which an instruction is input via a touch on its operation surface. The input interface 5 is connected to the control circuit 9, converts an operation instruction input by the operator into an electrical signal, and outputs the electrical signal to the control circuit 9. Herein, the input interface 5 is not limited to one that has physical operational components such as a mouse and a keyboard. Examples of the input interface 5 may include, for example, an electrical signal processing circuitry that receives an electrical signal corresponding to an operation instruction input from an external input device disposed separately from the automatic analyzing apparatus 1 and outputs the received electrical signal to the control circuit 9.

The output interface 6 is connected to the control circuit 9, and outputs the signal supplied from the control circuit 9. The output interface 6 is implemented by, for example, a display circuit, a printing circuit, and an audio device. The display circuit includes, for example, a cathode-ray tube (CRT) display, a liquid crystal display, an organic electroluminescence (EL) display, a light-emitting diode (LED) display, and a plasma display. The display circuit also includes processing circuitry which converts data representing a target of display into a video signal, and outputs the video signal to the outside. The printing circuit includes, for example, a printer, etc. The printing circuit also includes an output circuit which outputs data representing a target of printing to the outside. The audio device includes, for example, a speaker, etc. The audio device also includes an output circuit which outputs an audio signal to the outside.

The communication interface 7 is connected to, for example, the in-hospital network NW. The communication interface 7 performs data communications with a hospital information system (HIS) via the in-hospital network NW. The communication interface 7 may perform data communications with the HIS via a laboratory information system (LIS) connected to the in-hospital network NW.

The storage circuit 8 includes a processor-readable storage medium such as a magnetic storage medium, an optical storage medium, or a semiconductor memory. The storage circuit 8 is not necessarily implemented by a single storage device. For example, the storage circuit 8 may be implemented by a plurality of storage devices.

The storage circuit 8 stores an analysis program to be executed by the analysis circuit 3, and a control program for implementing the function of the control circuit 9. The storage circuit 8 stores, for each inspection item, calibration data generated by the analysis circuit 3. The storage circuit 8 stores, for each specimen, analysis data generated by the analysis circuit 3. The storage circuit 8 stores an inspection order input from an operator, or an inspection order received by the communication interface 7 via the in-hospital network NW.

The control circuit 9 functions as the nerve center of the automatic analyzing apparatus 1, and controls the overall operation of the automatic analyzing apparatus 1. The control circuit 9 executes a program stored in the storage circuit 8, and thereby implements the function corresponding to the executed program. The control circuit 9 is a processor that reads and executes a program in the storage circuit 8, and thereby implements a system control function 91 and an adjustment function 92. The control circuit 9 may include a storage area that stores at least some of the data stored in the storage circuit 8.

Through the system control function 91, the control circuit 9 collectively controls the respective units in the automatic analyzing apparatus 1 based on input information input from the input interface 5. For example, with the system control function 91, the control circuit 9 controls the driving mechanism 4 and the analysis mechanism 2 in such a manner as to perform inspection immediately, and controls the analysis circuit 3 in such a manner as to perform analysis in accordance with an inspection item.

Through the adjustment function 92, the control circuit 9 adjusts quantities of light of a plurality of light emitters 61 to be described later. The control circuit 9 that implements the adjustment function 92 is an example of an adjustment portion. The adjustment function 92 will be described later.

FIG. 2 is a schematic diagram showing an example of a configuration of the automatic analyzing apparatus 1. The analysis mechanism 2 includes a reaction disk 201, a thermostatic portion 202, a rack sampler 203, and a reagent storage 204.

The reaction disk 201 includes a plurality of placement portions for reaction tubes to be placed thereon. The reaction disk 201 conveys cuvettes 70 along a predetermined path. The reaction disk 201 is an example of the holder.

Specifically, the reaction disk 201 includes a plurality of slots 2011 as the plurality of placement portions. The reaction disk 201 is rotatable about a rotation axis R parallel to a vertical direction. The plurality of slots 2011 are arranged side by side along the circumferential direction centered on the rotation axis R of the reaction disk 201. Each of the plurality of slots 2011 is a groove recessed from the upper surface to the lower side of the reaction disk 201. The cuvettes 70 are respectively inserted as the reaction tubes into the slots 2011 so that each of the slots 2011 holds one cuvette 70. In this manner, the reaction disk 201 holds the plurality of cuvettes 70 aligned in a circular shape. With the cuvettes 70 being held by the reaction disk 201, the driving mechanism 4 alternately rotates and stops at predetermined time intervals. In this manner, the reaction disk 201 conveys the holding cuvettes 70.

The thermostatic portion 202 retains a heating medium set at a predetermined temperature and has the cuvettes 70 dipped into the heating medium retained therein, thus heating up the mixed solution contained in the cuvettes 70.

The rack sampler 203 movably supports a plurality of specimen racks 2031 each capable of holding a plurality of specimen vessels that contain a specimen for which a measurement request has been made. In the example shown in FIG. 2, a plurality of specimen racks 2031 each capable of holding five specimen vessels in parallel are shown.

In the rack sampler 203, a conveying region in which a specimen rack 2031 is conveyed from an injection position at which the specimen rack 2031 is injected to a withdrawal position from which the specimen rack 2031 for which the measurement has been completed is withdrawn is disposed. In the conveying region, a plurality of specimen racks 2031 aligned in a longitudinal direction are moved in a direction D1 by the driving mechanism 4.

In the rack sampler 203, a pull-in region in which the specimen rack 2031 is pulled from the conveying region is disposed to move the specimen vessel stored in the specimen rack 2031 to a predetermined sample aspiration position. The sample aspiration position is disposed at, for example, the position where a pivot track of a sample dispensing probe 207 and a movement track of an opening of the specimen vessel supported by the rack sampler 203 and held by the specimen rack 2031 intersect each other. In the pull-in region, a specimen rack 2031 that has been conveyed is moved in a direction D2 by the driving mechanism 4.

In the rack sampler 203, a return region for returning the specimen rack 2031 which holds a specimen vessel that has aspirated a specimen back to the conveying region is disposed. In the return region, the specimen rack 2031 is moved in a direction D3 by the driving mechanism 4.

The reagent storage 204 keeps a plurality of reagent vessels 100 cold. The reagent vessels 100 house the standard solution, the reagent used in each inspection item implemented on a specimen, and the like. The reagent storage 204 includes a reagent storage cover 2041 and a housing 2042. The reagent storage 204 is covered with a detachably attachable reagent storage cover 2041. A rotary table is rotatably disposed in the housing 2042. The rotary table holds the plurality of reagent vessels 100 placed in an annular shape. The reagent vessel 100 is, for example, a glass-made vessel formed into a columnar shape. More specifically, the reagent vessel 100 is a glass-made vessel formed into a cylindrical shape or a polygonal column-shape that can be housed in a predetermined cylinder. The reagent storage 204 is always kept cold even in the case where, for example, the function of the automatic analyzing apparatus 1 is stopped (for example, in a state in which the automatic analyzing apparatus 1 is on but is not operating (idle state) or in a state in which the automatic analyzing apparatus 1 is off). A specific configuration of the reagent storage 204 will be described later.

The analysis mechanism 2 shown in FIG. 2 includes a sample dispensing arm 206, a sample dispensing probe 207, a reagent dispensing arm 208, a reagent dispensing probe 209, and the photometry unit 60.

The sample dispensing arm 206 is disposed between the reaction disk 201 and the rack sampler 203. The sample dispensing arm 206 is disposed in such a manner as to be movable vertically upward and downward and to be horizontally pivotable by the driving mechanism 4. The sample dispensing arm 206 holds the sample dispensing probe 207 at one end.

The sample dispensing probe 207 pivots along an arc-like pivot track as the sample dispensing arm 206 pivots. On this pivot track, the sample aspiration position for aspirating a specimen from a specimen vessel held by the specimen rack 2031 on the rack sampler 203 is disposed. On the pivot track of the sample dispensing probe 207, a sample providing position for providing a specimen aspirated by the sample dispensing probe 207 to the cuvette 70 is disposed. The sample providing position corresponds to an intersection between the pivot track of the sample dispensing probe 207 and the movement track of the cuvette 70 held by the reaction disk 201.

The sample dispensing probe 207 is driven by the driving mechanism 4, and moves upward and downward at the sample aspiration position or the sample providing position. Under the control of the control circuit 9, the sample dispensing probe 207 aspirates a specimen from a specimen vessel stopped at the sample aspiration position. Under the control of the control circuit 9, the sample dispensing probe 207 provides the aspirated specimen to the cuvette 70 stopped at the sample providing position.

The reagent dispensing arm 208 is disposed between the reaction disk 201 and the reagent storage 204. The reagent dispensing arm 208 is disposed in such a manner as to be movable vertically upward and downward and to be horizontally pivotable by the driving mechanism 4. The reagent dispensing arm 208 holds the reagent dispensing probe 209 at one end.

The reagent dispensing probe 209 pivots along an arc-like pivot track as the reagent dispensing arm 208 pivots. On this pivot track, the sample aspiration position is disposed. The sample aspiration position is disposed at, for example, the position where the pivot track of the sample dispensing probe 209 and the movement track of the opening of the reagent vessel 100 placed in an annular shape on the rotary table intersect each other. On the pivot track of the reagent dispensing probe 209, a sample providing position for providing a reagent aspirated by the reagent dispensing probe 209 to the cuvette 70 is disposed. The reagent providing position corresponds to an intersection between the pivot track of the reagent dispensing probe 209 and the movement track of the cuvette 70 held by the reaction disk 201.

The reagent dispensing probe 209 is driven by the driving mechanism 4, and moves upward and downward at a reagent aspiration position or a reagent providing position on the pivot track. Under the control of the control circuit 9, the reagent dispensing probe 209 aspirates a reagent from the reagent vessel stopped at the reagent aspiration position. Under the control of the control circuit 9, the sample dispensing probe 209 provides the aspirated reagent to the cuvette 70 stopped at the reagent providing position.

FIG. 3 is a view of the reaction disk 201 as viewed from above.

The plurality of photometry units 60 are disposed inside the reaction disk 201. Each photometry unit 60 performs photometry on the solution in a reaction tube. Each photometry unit 60 is an example of a photometry unit. Specifically, each photometry unit 60 measures an optical physical property value in the mixed solution of the specimen and the reagent provided inside the cuvette 70. The same number of photometry units 60 as the number of the slots 2011 are disposed. That is, the same number of photometry units 60 as the number of cuvettes 70 that can be held by the reaction disk 201 are disposed. FIG. 3 illustrates only a part of the plurality of disposed slots 2011 and photometry units 60, and omits the others because they have the same configuration.

FIG. 4 is a diagram showing one of the photometry units 60. FIG. 4 shows a cross section substantially parallel to the rotation axis R of the reaction disk 201 and substantially parallel to the radial direction centered on the rotation axis R.

Each photometry unit 60 has a light emitter 61 and a light receiver 62. The light emitter 61 is an example of a first light emitter. The light receiver 62 is an example of a first light receiver. The light emitter 61 is located on the inner side (inner peripheral side) of each slot 2011 in the radial direction. The light emitter 61 is located between the slot 2011 and the rotation axis R of the reaction disk 201. The light receiver 62 is located on the outer side (outer peripheral side) of each slot 2011 in the radial direction.

The light emitter 61 is a light source that emits light to the outer side in the radial direction. The light emitter 61 is implemented by, for example, an LED or a laser light source. Light L emitted from the light emitter 61 (hereinafter referred to as emitted light) travels toward the slot 2011 and the light receiver 62 along the horizontal direction and the radial direction of the reaction disk 201. An optical axis O of light emitted from the light emitter 61 is perpendicular to the rotation axis R of the reaction disk 201 and is substantially parallel to the horizontal direction.

When light is emitted from the light emitter 61 in a state in which the cuvette 70 in which the mixed solution of the standard solution and the reagent is inserted inside is inserted into the slot 2011, emitted light L is transmitted through the mixed solution of the standard solution and the reagent inside the cuvette 70, thereby being incident on the light receiver 62.

The light receiver 62 is a photodetector that detects transmitted light. The light receiver 62 detects light transmitted through the mixed solution of the standard solution and the reagent in the cuvette 70. The light receiver 62 samples the detected light at predetermined time intervals. The predetermined time interval is, for example, a 0.1 second interval. Based on a detection result, the light receiver 62 measures a quantity of transmitted light, the intensity of transmitted light, the absorbance, etc. A measurement result is transmitted to the control circuit 9.

The light receiver 62 may output the intensity of the detected light as a detection signal to the analysis circuit 3. At this time, the analysis circuit 3 samples a detection signal at predetermined time intervals and generates standard data and inspection target data.

Each photometry unit 60 may further include a scattered light detector. In such a case, the scattered light detector is disposed at a position away from each slot 2011 in the circumferential direction inside the reaction disk 201. The scattered light detector is arranged, for example, in a position which is 90 degrees away from the light emitter 61 or the light receiver 62 in the circumferential direction centered on the center of each slot 2011. In this case, the optical axis of light emitted from the light emitter 61 and the light receiving axis of the scattered light detector intersect at approximately 90 degrees inside the cuvette 70 inserted into the slot 2011. Light emitted from the light emitter 61 is incident on the inside of the cuvette 70, is scattered by the particles in the mixed solution injected into the inside of the cuvette 70, and is then emitted from the side wall of the cuvette 70. The scattered light detector detects light scattered by the mixed solution of the standard solution and the reagent in the cuvette 70. The scattered light detector samples detected light at predetermined time intervals, for example, at 0.1 second intervals, and measures a quantity of scattered light, intensity of scattered light, etc. The measurement result is sent to the analysis mechanism 2 and the control circuit 9 and is used for quantitative analysis of the specimen.

Next, the configuration of the cuvette 70 will be described.

The cuvette 70 is a vessel formed in such a manner as to be capable of holding a specimen, a reagent, or a mixed solution thereof. The cuvette 70 is, for example, a bottomed cylindrical member having its upper surface open.

The cuvette 70 includes a body portion 71 and a flange 72. The cuvette 70 is made of, for example, polypropylene (PP) or acrylic, and is formed by integral molding.

Herein, the longitudinal axis C1 of the body portion 71 is defined. The body portion 71 extends along the longitudinal axis C1. With the cuvette 70 being inserted into the slot 2011, the longitudinal axis C1 of the body portion 71 is substantially parallel to the rotation axis R of the reaction disk 201. Of the directions along the longitudinal axis C1, the direction in which the cuvette 70 faces upward while being inserted into the slot 2011 is defined as the upper side of the cuvette 70, and the direction in which the cuvette 70 faces downward while being inserted into the slot 2011 is defined as the lower side of the cuvette 70.

The body portion 71 is a bottomed tubular member having its upper surface open. The body portion 71 is, for example, a bottomed cylindrical member. The body portion 71 has a plurality of photometry parts in its tubular part. Each of the plurality of photometry parts is a plane. Each of the plurality of photometry parts is a part to which light from the photometry unit is emitted. The body portion 71 is provided with, for example, four photometry parts. An opening is formed in the upper end of the body portion 71. A specimen or reagent is inserted into the inside of the body portion 71 through an opening formed in the upper end of the body 71.

The flange 72 is an annular member. The outer diameter of the flange 72 is larger than the outer diameter of the body portion 71. When the cuvette 70 is inserted into the slot 2011, the cuvette 70 is supported by the reaction disk 201 by the flange 72 being supported from below by the upper surface of the reaction disk 201.

In each of the slots 2011 in the reaction disk 201, light L is emitted to the cuvette 70 into which the mixed solution of the specimen and the reagent is inserted, and a quantity of light transmitted through the mixed solution and the cuvette 70 is measured. For example, with the automatic analyzing apparatus 1 for clinical examination, a biological specimen such as blood, urine, etc., is injected as a specimen. Based on the measured quantity of light, the analysis mechanism 2 and the control circuit 9 perform a quantitative analysis of the specimen. For example, the analysis mechanism 2 and the control circuit 9 analyze a concentration of a substance to be measured, an activity value, or a time required for change.

Next, the adjustment mechanism 16 and cuvettes for adjustment 80 (hereinafter, simply referred to as adjustment cuvettes 80) will be described. The adjustment mechanism 16 is used while it is attached to the analysis mechanism 2. The adjustment mechanism 16 is used together with the adjustment cuvettes 80 to be described later when adjusting the photometry unit 60 at the time of shipment of the automatic analyzing apparatus 1 or at the time of maintenance performed against age deterioration. The adjustment cuvettes 80 are jigs that are respectively inserted into the plurality of slots 2011 and guide light emitted from the light emitters 61 to the outside of the slots 2011.

Figure 5:
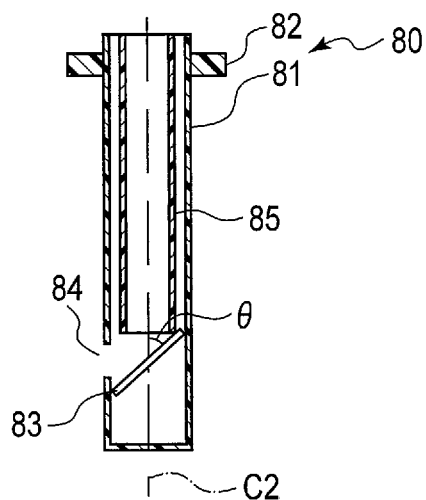
FIG. 5 is a diagram showing an example of a configuration of a jig used for the automatic analyzing apparatus according to the first embodiment.
Figure 6:
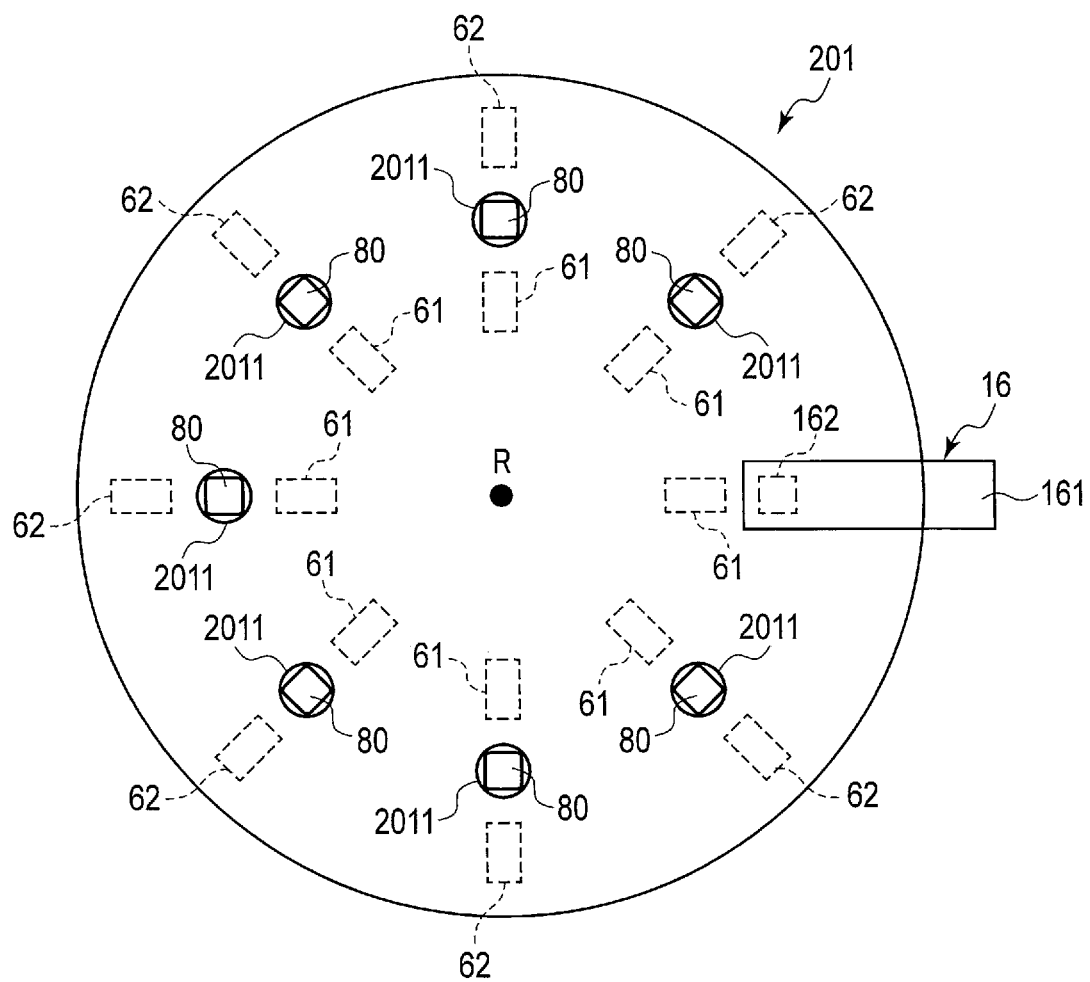
FIG. 6 is a schematic view of the holder as viewed from above in a state in which the jig is held by the holder of the automatic analyzing apparatus according to the first embodiment.

FIG. 5 is a diagram showing an example of the configuration of the adjustment cuvette 80. FIG. 6 is a schematic view showing a state as viewed from above, in which the adjustment cuvettes 80 are respectively arranged in the plurality of slots 2011, and the adjustment mechanism 16 is attached.

Each of the adjustment cuvettes 80 has a body portion 81, a flange 82, a mirror 83, a light guide hole 84, and an optical path tube 85.

The body portion 81 and the flange 82 are formed into the same shapes as those of the body portion 71 and the flange 72 of the cuvette 70. The body portion 81 is held in the slot 2011. The adjustment cuvette 80 is formed into a bottomed cylindrical shape having its upper surface open. The body portion 81 and the flange 82 are made of, for example, polypropylene (PP) or acrylic, and are formed by integral molding. Furthermore, the body portion 81 and the flange 82 are preferably formed in such a manner as to block an incidence of light from the outside. In this case, for example, the body portion 81 and the flange 82 are blackened by painting or blackening a transparent acrylic.

Herein, the longitudinal axis C2 of the body portion 81 is defined. The body portion 81 extends along the longitudinal axis C2. With the adjustment cuvette 80 being inserted into the slot 2011, the longitudinal axis C2 of the body portion 81 is substantially parallel to the rotation axis R of the reaction disk 201. Of the directions along the longitudinal axis C2, the direction in which the adjustment cuvette 80 faces upward while being inserted into the slot 2011 is defined as the upper side of the adjustment cuvette 80, and the direction in which the adjustment cuvette 80 faces downward while being inserted into the slot 2011 is defined as the lower side of the adjustment cuvette 80.

The body portion 81 is a bottomed tubular member having its upper surface open. The body portion 81 is a bottomed cylindrical member. An opening is formed in the upper end of the body portion 81.

The flange 82 is an annular member. The flange 82 is arranged at the upper portion of the body portion 81. The outer diameter of the flange 82 is larger than the outer diameter of the body portion 81. When the adjustment cuvette 80 is inserted into the slot 2011, the adjustment cuvette 80 is supported by the reaction disk 201 by the flange 82 being supported from below by the upper surface of the reaction disk 201.

The mirror 83 has a mirror surface that reflects light. The mirror 83 is installed inside the body portion 81. The mirror 83 is arranged below the flange 82. The mirror 83 is installed inside the body portion 81 in such a manner that the adjustment cuvette 80 is located at substantially the same height as the light emitter 61 of the photometry unit 60 in a state in which the adjustment cuvette 80 is inserted into the slot 2011.

The mirror 83 is installed inside the body portion 81 in such a manner that the mirror surface is tilted with respect to each of the longitudinal axis C2 and the optical axis O in a state in which the adjustment cuvette 80 is inserted into the slot 2011. Specifically, in a state in which the adjustment cuvette 80 is inserted into the slot 2011, the mirror 83 is installed in such a manner that the mirror surface faces the side in which the light emitter 61 is arranged and that the mirror surface faces the upper side. The angle θ of the mirror surface of the mirror 83 with respect to the longitudinal axis C2 is set in such a manner that light emitted from the light emitter 61 is reflected toward a light receiver for adjustment 162 (hereinafter, simply referred to as an adjustment light receiver 162) arranged above the reaction disk 201. The angle θ is, for example, 45°.

The light guide hole 84 is a through hole disposed in the side surface of the bottomed tubular shape in the body portion 81. The light guide hole 84 is disposed at a position that faces the light emitter 61 and has substantially the same height as the light emitter 61 and the mirror 83 in a state in which the adjustment cuvette 80 is inserted into the slot 2011. The light guide hole 84 is preferably formed into a shape and a size that allow all of the light emitted from the light emitter 61 to pass through.

The optical path tube 85 is installed inside the body portion 81. The optical path tube 85 is arranged in the upper side of the mirror 83 inside the body portion 81. The optical path tube 85 is a tubular member having both ends open, and extends along the longitudinal axis C2. The optical path tube 85 is made of a material whose inner surface reflects light. The optical path tube 85 is, for example, an optical fiber. The optical path tube 85 guides light reflected off the mirror surface of the mirror 83 to the upper side.

Figure 7:
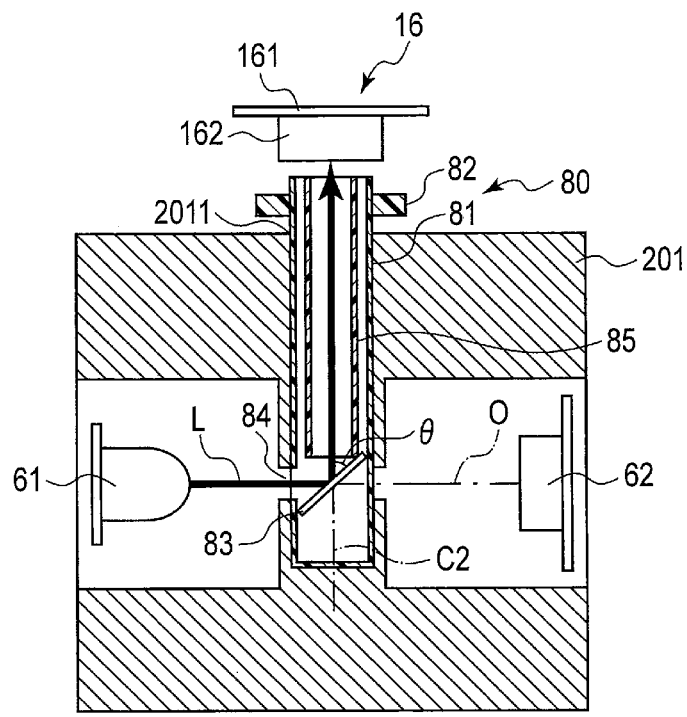
FIG. 7 is a sectional view showing a state in which the jig is held by the holder of the automatic analyzing apparatus according to the first embodiment.

FIG. 7 is a diagram showing an example of the configuration of the adjustment mechanism 16. FIG. 7 shows a cross section substantially parallel to the rotation axis R of the reaction disk 201 and substantially parallel to the radial direction centered on the rotation axis R. The adjustment mechanism 16 is attached to the analysis mechanism 2. The adjustment mechanism 16 may be fixed to the analysis mechanism 2 or may be detachably attached to the analysis mechanism 2.

The adjustment mechanism 16 includes a supporter 161 and the adjustment light receiver 162.

The supporter 161 supports the adjustment light receiver 162. One end of the supporter 161 is connected to the analysis mechanism 2. The adjustment light receiver 162 is attached to the other end of the supporter 161. The supporter 161 supports the adjustment light receiver 162 in such a manner that the adjustment light receiver 162 is arranged above the slots 2011 of the reaction disk 201. The supporter 161 may include an arm capable of adjusting the position of the adjustment light receiver 162.

The adjustment light receiver 162 is a single photodetector. The adjustment light receiver 162 receives light generated from a plurality of light emitters and guided by jigs respectively inserted into a plurality of mounting portions. The adjustment light receiver 162 is an example of the second light receiver. Specifically, the adjustment light receiver 162 measures light emitted from the light emitters 61 and having passed through the insides of the adjustment cuvettes 80 inserted into the slots 2011. The adjustment light receiver 162 samples the detected light at predetermined time intervals. The predetermined time interval is, for example, a 0.1 second interval. Based on a detection result, the adjustment light receiver 162 measures a quantity of transmitted light, the intensity of transmitted light, the absorbance, etc. The adjustment light receiver 162 is electrically connected to the control circuit 9 via, for example, a connector. The adjustment light receiver 162 transmits the measured quantity of transmitted light, the intensity of transmitted light, the absorbance, etc., to the control circuit 9.

Emitted light L emitted from the light emitter 61 with the adjustment cuvette 80 being inserted into the slot 2011 enters the inside of the body portion 81 through the light guide hole 84 and is reflected off the mirror surface of the mirror 83. At this time, the emitted light L transitions from a state of traveling along the horizontal direction to a state of traveling to the upper side along the vertical direction. The emitted light L reflected off the mirror surface of the mirror 83 enters the inside of the optical path tube 85 from the lower side, passes through the inside of the optical path tube 85, and protrudes toward the outside of the adjustment cuvette 80. The emitted light L having protruded to the upper side from the adjustment cuvette 80 is incident on the adjustment light receiver 162 disposed above the adjustment cuvette 80. The adjustment light receiver 162 detects the received emitted light L and measures a quantity of emitted light L, etc.

The adjustment cuvette 80 according to the present embodiment is formed in such a manner as to have the same outer shape as that of the cuvette 70; however, this is not a limitation. It suffices that the adjustment cuvette 80 has an outer shape that can be held in the slot 2011, has the mirror 83 which the light emitted from the light emitter 61 can be reflected off, and has the optical path tube 85 that guides the light reflected off the mirror 83 to the adjustment light receiver 162 arranged outside the slot 2011. For example, it suffices that the body portion 81 is capable of supporting the mirror 83 and the optical path tube 85. Furthermore, the light guide hole 84 may not be disposed.

Next, a procedure for adjusting a quantity of light of the light emitter 61 using the automatic analyzing apparatus 1 according to the present embodiment will be described. The light quantity adjustment of the light emitter 61 is performed at the time of calibration of the automatic analyzing apparatus 1, for example at the time of shipment of the automatic analyzing apparatus 1 or at the time of maintenance performed against the age deterioration of the automatic analyzing apparatus 1.

When performing the light quantity adjustment on the light emitter 61, an operator first arranges the adjustment cuvettes 80 in the plurality of slots 2011, respectively, as shown in FIG. 6. At this time, the orientation of the adjustment cuvettes 80 is adjusted in such a manner that the mirrors 83 and the light guide holes 84 of the adjustment cuvettes 80 respectively face the light emitters 61.

Next, the operator arranges the adjustment light receiver 162 above the reaction disk 201. In the case where the adjustment mechanism 16 is fixed to the analysis mechanism 2, the operator drives the arm of the supporter 161 to arrange the adjustment light receiver 162 in a position directly above the slot 2011 into which the adjustment cuvette 80 is inserted. The adjustment mechanism 16 is preferably arranged in such a manner that the distance between the adjustment light receiver 162 and the adjustment cuvette 80 becomes as small as possible. In the case where the adjustment mechanism 16 is detachably attachable to the analysis mechanism 2, the adjustment mechanism 16 is attached to the analysis mechanism 2 in such a manner that the adjustment light receiver 162 is fixed to a position directly above the slot 2011 into which the adjustment cuvette 80 is inserted, and at the same time, the adjustment light receiver 162 is connected to the control circuit 9 by using a connector, etc.

Next, the operator inputs an instruction to start the light quantity adjustment processing in the input interface 5. The light quantity adjustment processing is processing that is executed through the adjustment function 92 of the control circuit 9, and adjusts quantities of light of the plurality of light emitters 61 based on a plurality of light quantity signals from the single adjustment light receiver 162 that receives light generated by the plurality of light emitters 61 and guided by the adjustment cuvettes 80 respectively inserted into the plurality of slots 2011. In the light quantity adjustment processing, the control circuit 9 conveys, through the adjustment function 92, each adjustment cuvette 80 held by the reaction disk 201 to the adjustment light receiver 162, thereby causing the adjustment light receiver 162 to receive a plurality of beams of light respectively generated by the plurality of light emitters 61. The control circuit 9 starts the light quantity adjustment processing by the instruction to start the light quantity adjustment process being input to the input interface 5.

Figure 8:
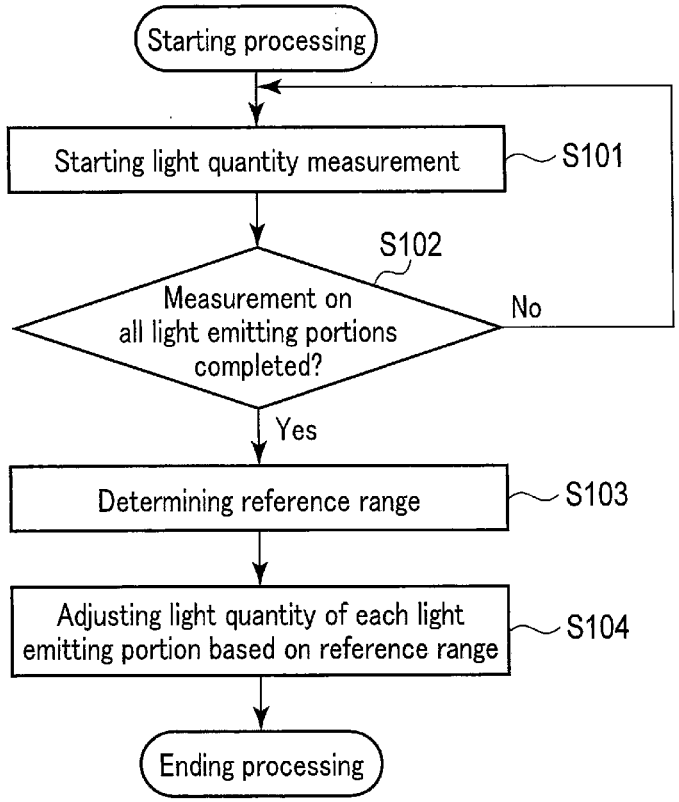
FIG. 8 is a flowchart illustrating a processing procedure of light quantity adjustment processing performed by the automatic analyzing apparatus according to the first embodiment.

Next, the light quantity adjustment processing will be described. FIG. 8 is a flowchart showing an example of the procedure of the light quantity adjustment processing according to the present embodiment.

Note that the processing procedure in the light quantity adjustment processing described below is only an example, and each processing can be changed as appropriate as possible. Omission, replacement, and addition of a step in the processing procedure described hereinafter can be made as appropriate, in accordance with an actual situation where the present embodiment is realized.

(Light Quantity Adjustment Processing)
(Step S101)

The control circuit 9 causes the light emitter 61 to emit light to the arrangement cuvette 80 arranged in the slot 2011 positioned directly below the adjustment light receiver 162. Light emitted from the light emitter 61 is reflected off the mirror surface of the mirror 83 inside the adjustment cuvette 80 and transitions from a state of traveling along the horizontal direction to a state of traveling to the upper side along the vertical direction. The emitted light L having protruded to the upper side from the adjustment cuvette 80 is incident on the adjustment light receiver 162 disposed above the adjustment cuvette 80. The adjustment light receiver 162 measures a quantity of received light. The control circuit 9 acquires, as a light quantity signal of the photometry unit 60 to be measured, a quantity of light measured by the adjustment light receiver 162.

(Step S102)

Next, the control circuit 9 determines whether or not the measurement of the amount of light for all the photometric units 60 has been completed. If the measurement of the amount of light for all the photometric units 60 has been completed (Yes in step S102), the processing proceeds to step S103. If the measurement of the amount of light has not been completed for all the photometric units 60 (No in step S102), the control circuit 9 conveys the adjustment cuvette 80 along the circumferential direction of the reaction disk 201 by rotating the reaction disk 201 by a predetermined angle. At this time, the slot 2011 positioned directly below the adjustment light receiver 162 is switched from one to another. The control circuit 9 rotates the reaction disk 201 in such a manner that the slot 2011 corresponding to the photometry unit 60 for which a quantity of light has not been measured is moved to a position directly below the adjustment light receiver 162. The control circuit 9 moves, for example, the slot 2011 adjacent to the slot 2011 for which a quantity of light has already been measured to a position directly below the adjustment light receiver 162. Then, the control circuit 9 repeatedly executes the processing in n steps S101 and S102 until light quantity adjustment with respect to all of the photometry units 60 is completed.

The order of performing light quantity adjustment on the photometry units 60 is not limited to the above configuration. For example, light quantity adjustment may be performed according to a preset order. Furthermore, instead of performing light quantity adjustment on all of the photometry units 60, light quantity adjustment may be performed on only the preset photometry unit 60. Alternatively, instead of performing light quantity adjustment on all of the photometry units 60, light quantity adjustment may be performed on the photometry unit 60 corresponding to the slot 2011 into which the adjustment cuvette 80 is inserted.

(Step S103)

Upon completion of light quantity measurement with respect to all of the photometry units 60, the control circuit 9 determines a range of quantities of light (hereinafter, referred to as a reference range), which serves as a reference for light quantity adjustment, based on quantities of light respectively measured by the photometry units 60. The reference range corresponds to, for example, values of quantities of light having a predetermined range centered on an average value of quantities of light of the photometry units 60, acquired in step S102. Instead of the average value, a median value of quantities of light respectively acquired for the photometry units 60 may be used.

(Step S104)

The control circuit 9 adjusts a quantity of light emitted from the light emitter 61 of each of the photometry units 60 based on the reference range. At this time, the control circuit 9 adjusts a current to be supplied to each of the light emitters 61 in such a manner that each of the quantities of light respectively emitted from the light emitters 61 takes on a value within the reference range. By making adjustment in such a manner that each of the quantities of light respectively from the light emitters 61 falls within the reference range, variations in quantities of light among the plurality of light emitters 61 are suppressed. Thereafter, the control circuit 9 terminates the light quantity adjustment processing.

Hereinafter, the advantageous effects of the automatic analyzing apparatus 1 according to the present embodiment will be described.

For example, LEDs used as the light emitters 61 may individually have different quantities of emitted light. Similarly, photodetectors used as the light receivers 62 may individually be different in terms of light receiving accuracy. Therefore, in the case of using the plurality of photometry units 60, the measurement accuracy may vary among the photometry units 60. In order to suppress variations in measurement accuracy among the photometry units 60, it is necessary to adjust quantities of light emitted from the plurality of light emitters 61 and to adjust gains of the plurality of light receivers 62 at the time of shipment of the automatic analyzing apparatus 1. In addition, the degree of change in measurement accuracy due to age deterioration may differ for each individual of the light emitters 61 and the light receivers 62. Therefore, it is necessary to periodically perform maintenance to adjust quantities of light emitted from the plurality of light emitters 61 and to adjust gains of the plurality of light receivers 62.

The variation in measurement accuracy between the photometry units 60 is due to both a parameter related to the light emitters 61, such as a quantity of emitted light, and a parameter related to the light receivers 62, such as a gain. Therefore, adjustment of the measurement accuracy between the photometry units 60 requires a plurality of parameters to be adjusted at the same time, and thus takes time.

The automatic analyzing apparatus 1 according to the present embodiment includes the reaction disk 201, the photometry units 60, and the control circuit 9. The reaction disk 201 has the plurality of slots 2011 for holding the plurality of adjustment cuvettes 80. The photometry units 60 perform photometry on the solutions respectively contained in the plurality of cuvettes 70. The photometry units 60 have the plurality of light emitters 61 and the plurality of light receivers 62 respectively disposed in the plurality of slots 2011. The control circuit 9 adjusts quantities of light of the plurality of light emitters 61 based on a plurality of light quantity signals from the single adjustment light receiver 162 that receives light generated by the plurality of light emitters 61 and guided by the adjustment cuvettes 80 respectively inserted into the plurality of slots 2011.

With the automatic analyzing apparatus 1 according to the present embodiment configured as described in the above, light quantity adjustment with respect to the plurality of light emitters 61 can be performed using the single adjustment light receiver 162 by using the adjustment cuvettes 80 that guide light emitted from the light emitters 61 to the outside and the single adjustment light receiver 162 that receives light guided from the plurality of adjustment cuvettes 80. This makes it possible to adjust variations among the light emitters 61 regardless of variations among parameters related to the light receivers 62.

As described in the above, with the automatic analyzing apparatus 1 according to the present embodiment, light quantity adjustment with respect to a large number of light emitters 61 can automatically be performed at the time of shipment of the automatic analyzing apparatus 1 or at the time of maintenance performed against age deterioration. This makes it possible to stabilize the system that performs light quantity adjustment, improve the accuracy of light quantity adjustment, and shorten a time required for light quantity adjustment. Furthermore, this realizes reduction of adjustment man-hours at the time of shipment and maintenance man-hours.

After completion of the light quantity adjustment processing, gains of the light receivers 62 may be adjusted by using the adjusted light emitters 61. In this case, in each of the photometry units 60, a gain of the light receiver 62 is adjusted in such a manner that a quantity of light that is emitted from the light emitter 61 and is received by the light receiver 62 takes on a value within a the reference range. In this case, parameters that affect variations in measurement accuracy among the photometry units 60 can be adjusted one by one, and the adjustment can be easily performed.

Furthermore, the adjustment mechanism 16 according to the present embodiment is detachably attachable to the analysis mechanism 2. In this case, at the time of manufacture of the automatic analyzing apparatus 1, operation is performed with the adjustment mechanism 16 being removed, and the adjustment mechanism 16 can be attached only when light quantity adjustment is performed at the time of shipment of the automatic analyzing apparatus 1.

Modification of First Embodiment

A modification of the first embodiment will be described. The present modification is a modification of the configuration of the first embodiment as will be described below. In the present modification, the adjustment light receiver 162 is arranged below the reaction disk 201. Descriptions of the configurations, operations, and advantageous effects similar to those of the first embodiment will be omitted.

Figure 9:
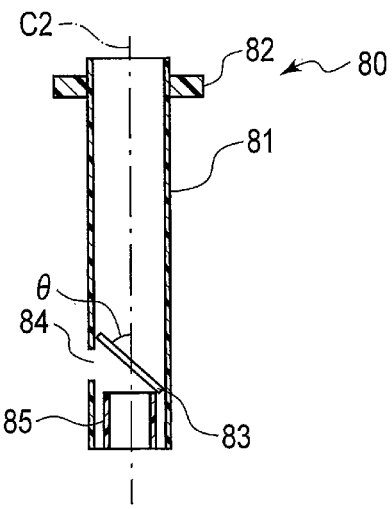
FIG. 9 is a diagram showing an example of a configuration of the jig used for the automatic analyzing apparatus according to the first embodiment.

FIG. 9 is a diagram showing an example of the configuration of the adjustment cuvette 80 used in light quantity adjustment of the automatic analyzing apparatus 1 according to the present modification.

In the present modification, an opening is disposed in the bottom surface of the body portion 81.

Specifically, in a state in which the adjustment cuvette 80 is inserted into the slot 2011, the mirror 83 is installed in such a manner that the mirror surface faces the side in which the light emitter 61 is arranged and that the mirror surface faces the lower side. The angle θ of the mirror surface of the mirror 83 with respect to the longitudinal axis C2 is set in such a manner that light emitted from the light emitter 61 is reflected toward the adjustment light receiver 162 arranged below the reaction disk 201. The angle θ is, for example, 45°.

The light guide hole 84 is disposed at a position that faces the light emitter 61 and has substantially the same height as the light emitter 61 and the mirror 83 in a state in which the adjustment cuvette 80 is inserted into the slot 2011.

The optical path tube 85 is arranged in the lower side of the mirror 83 inside the body portion 81. The optical path tube 85 guides light reflected off the mirror surface of the mirror 83 to the lower side.

Figure 10:
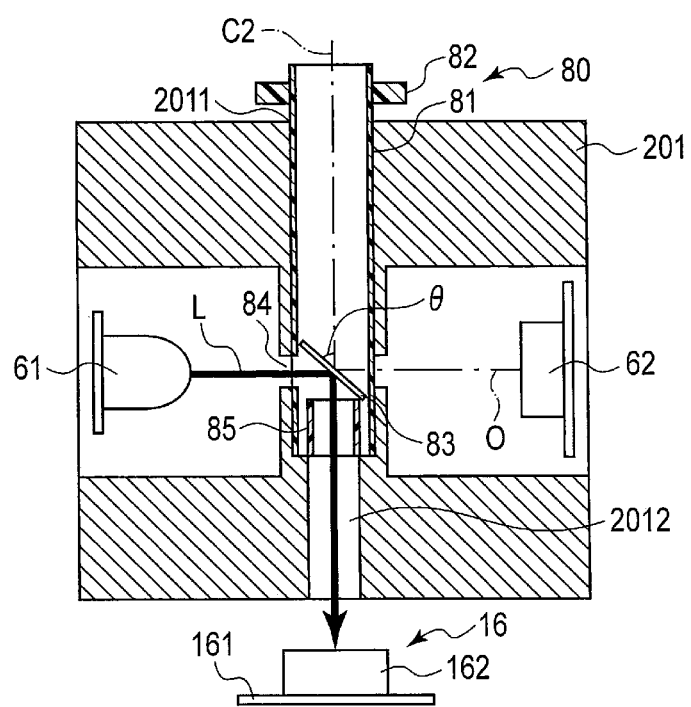
FIG. 10 is a sectional view showing a state in which a jig is held by a holder of an automatic analyzing apparatus according to a modification of the first embodiment.

FIG. 10 is a diagram showing an example of the configuration of the adjustment mechanism 16 according to the present modification. The adjustment mechanism 16 is fixed to the analysis mechanism 2. FIG. 10 shows a cross section substantially parallel to the rotation axis R of the reaction disk 201 and substantially parallel to the radial direction centered on the rotation axis R.

The supporter 161 supports the adjustment light receiver 162 in such a manner that the adjustment light receiver 162 is arranged below the slots 2011 of the reaction disk 201.

In the slots 2011 of the reaction disk 201, openings are respectively disposed in bottom surfaces of placement portions that the slots 2011 form. The reaction disk 201 has optical paths 2012. The optical paths 2012 are respectively disposed in the slots 2011. Each of the optical paths 2012 is a through hole disposed in such a manner as to extend from the opening disposed in the bottom surface of the slot 2011 to the lower surface of the reaction disk 201. Each of the optical paths 2012 is a hollow that communicates the bottom surface of the slot 2011 with the lower surface of the reaction disk 201. Each of the optical paths 2012 guides light reflected off the mirror surface of the mirror 83 to the lower side of the reaction disk 201.

Emitted light L emitted from the light emitter 61 with the adjustment cuvette 80 being inserted into the slot 2011 enters the inside of the body portion 81 through the light guide hole 84 and is reflected off the mirror surface of the mirror 83. At this time, the emitted light L transitions from a state of traveling along the horizontal direction to a state of traveling to the lower side along the vertical direction. The emitted light L reflected off the mirror surface of the mirror 83 enters the inside of the optical path tube 85 from the upper side, passes through the inside of the optical path tube 85, and protrudes outside of the adjustment cuvette 80. The emitted light L having protruded to the lower side from the adjustment cuvette 80 passes through the opening disposed in the bottom surface of the slot 2011 and then the optical path 2012, and is incident on the adjustment light receiver 162 disposed below the reaction disk 201. The adjustment light receiver 162 detects the received emitted light L and measures a quantity of emitted light L, etc.

As with the first embodiment, with the automatic analyzing apparatus 1 according to the present modification, by using the adjustment cuvettes 80 that guide light emitted from the light emitters 61 to the outside and the single adjustment light receiver 162 that receives light guided from the plurality of adjustment cuvettes 80, light quantity adjustment with respect to the plurality of light emitters 61 can be performed using the single adjustment light receiver 162. In addition, the adjustment light receiver 162 according to the present modification is fixed to the lower side of the reaction disk 201. This prevents the adjustment light receiver 162 from interfering with operation such as insertion or removal of each cuvette 70 during use of the automatic analyzing apparatus 1. This can omit the load of attaching and detaching the adjustment mechanism 16 when performing light quantity adjustment.

Second Embodiment

Next, the second embodiment will be described. The present embodiment is a modification of the configuration of the first embodiment as will be described below. In the present embodiment, gains of the receivers 62 are adjusted using a light emitter for adjustment 163 (hereinafter, simply referred to as an adjustment light emitter 163) disposed instead of the adjustment light receiver 162. Descriptions of the configurations, operations, and advantageous effects similar to those of the first embodiment will be omitted.

Through an adjustment function 92, the control circuit 9 adjusts gains of the plurality of light emitters 62. The control circuit 9 that implements the adjustment function 92 is an example of an adjustment portion.

Figure 11:
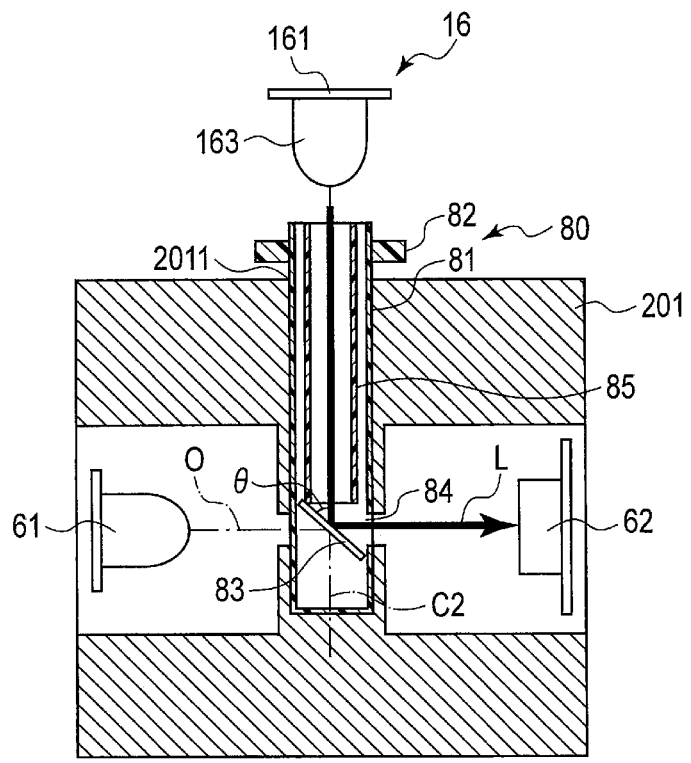
FIG. 11 is a sectional view showing a state in which a jig is held by a holder of an automatic analyzing apparatus according to a second embodiment.

FIG. 11 is a diagram showing an example of the configuration of the adjustment mechanism 16. FIG. 11 shows a cross section substantially parallel to the rotation axis R of the reaction disk 201 and substantially parallel to the radial direction centered on the rotation axis R. The adjustment mechanism 16 includes the supporter 161 and the adjustment light emitter 163.

The supporter 161 supports the adjustment light emitter 163. One end of the supporter 161 is connected to the analysis mechanism 2. The adjustment light emitter 163 is attached to the other end of the supporter 161. The supporter 161 supports the adjustment light emitter 163 in such a manner that the adjustment light emitter 163 is arranged above the slots 2011 of the reaction disk 201.

The adjustment light emitter 163 is a light source that emits light to the lower side. The adjustment light emitter 163 is implemented by, for example, an LED or a laser light source. The adjustment light emitter 163 is electrically connected to the control circuit 9 via, for example, a connector. The control circuit 9 supplies electric power to the adjustment light emitter 163. The adjustment light emitter 163 is an example of the second light emitter.

The adjustment cuvettes 80 are jigs that are respectively inserted into the plurality of slots 2011 one by one and guide light emitted from the adjustment light emitter 163 arranged outside the slots 2011 to the light receivers 62. In a state in which the adjustment cuvette 80 is inserted into the slot 2011, the mirror 83 is arranged in such a manner that the mirror surface faces the side in which the light receiver 62 is arranged and that the mirror surface faces the upper side. The mirror 83 is arranged in such a manner that light emitted from the adjustment light emitter 163 arranged above the reaction disk 201 is reflected toward the light receiver 62.

The emitted light L emitted from the adjustment light emitter 163 with the adjustment cuvette 80 being inserted into the slot 2011 enters the adjustment cuvette 80 from the upper side, passes through the inside of the optical path tube 85, and is reflected off the mirror surface of the mirror 83. At this time, the emitted light L transitions from a state of traveling to the lower side along the vertical direction to a state of traveling along the horizontal direction. The emitted light L reflected off the mirror surface of the mirror 83 passes through the light guide hole 84, protrudes to the outside of the adjustment cuvette 80, and is incident on the light receiver 62. The light receiver 62 detects the received emitted light L and measures a quantity of emitted light L, etc. The light receiver 62 transmits the measured quantity of light to the control circuit 9.

Next, a procedure for performing gain adjustment of the light receiver 62 using the automatic analyzing apparatus 1 according to the present embodiment will be described. The gain adjustment of the light receiver 62 is performed at the time of calibration of the automatic analyzing apparatus 1, for example at the time of shipment of the automatic analyzing apparatus 1 or at the time of maintenance performed against the age deterioration of the automatic analyzing apparatus 1.

When performing the gain adjustment of the light receiver 62, an operator first arranges the adjustment cuvettes 80 in the plurality of slots 2011, respectively. At this time, the orientation of the adjustment cuvettes 80 is adjusted in such a manner that the mirrors 83 and the light guide holes 84 of the adjustment cuvettes 80 respectively face the light receivers 62.

Next, the operator arranges the adjustment light emitter 163 above the reaction disk 201. In the case where the adjustment mechanism 16 is fixed to the analysis mechanism 2, the operator drives the arm of the supporter 161 to arrange the adjustment light emitter 163 in a position directly above the slot 2011 in which the adjustment cuvette 80 is inserted. The adjustment mechanism 16 is preferably arranged in such a manner that the distance between the adjustment light emitter 163 and the adjustment cuvette 80 becomes as small as possible. In the case where the adjustment mechanism 16 is detachably attachable to the analysis mechanism 2, the adjustment mechanism 16 is attached to the analysis mechanism 2 in such a manner that the adjustment light emitter 163 is fixed to a position directly above the slot 2011 into which the adjustment cuvette 80 is inserted.

Next, the operator inputs an instruction to start the gain adjustment processing in the input interface 5. The gain adjustment processing is processing that is executed through the adjustment function 92 of the control circuit 9 and adjusts gains of the plurality of light receivers 62 based on a plurality of light quantity signals from the plurality of light receivers 62 that receive light generated by the single adjustment light emitter 163 and guided by the adjustment cuvettes 80 respectively inserted into the plurality of slots 2011. In the gain adjustment processing, the control circuit 9 conveys, through the adjustment function 92, each adjustment cuvette 80 held by the reaction disk 201 to the adjustment light emitter 163, thereby causing the plurality of light receivers 62 to receive light generated by the adjustment light emitter 163. The control circuit 9 starts the gain adjustment processing by the instruction to start the gain adjustment process being input to the input interface 5.

Figure 12:
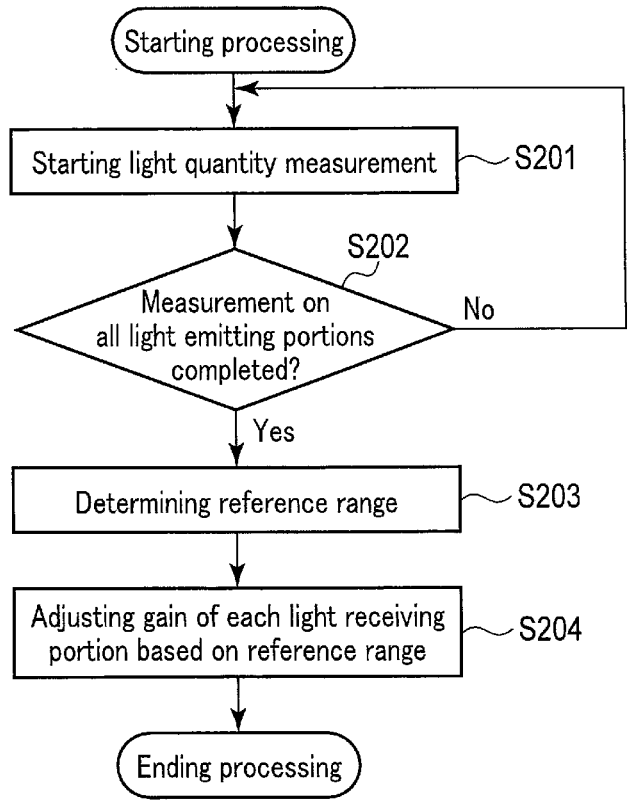
FIG. 12 is a flowchart illustrating a processing procedure of light quantity adjustment processing performed by the automatic analyzing apparatus according to the second embodiment.

Next, the gain adjustment processing will be described. FIG. 12 is a flowchart showing an example of a procedure of gain adjustment processing according to the present embodiment.

Note that the processing procedure in the gain adjustment processing described below is only an example, and each processing can be changed as appropriate as possible. Omission, replacement, or addition of a step in the process procedure described hereinafter can be made as appropriate, in accordance with an actual situation where the present embodiment is realized.

(Gain Adjustment Processing)
(Step S201)
The control circuit 9 causes the adjustment light emitter 163 to emit light to the arrangement cuvette 80 arranged in the slot 2011 positioned directly below the adjustment light emitter 163. Light emitted from the adjustment light emitter 163 disposed above the adjustment cuvette 80 enters the adjustment cuvette 80. The emitted light L is reflected off the mirror surface of the mirror 83, transitions from a state of traveling to the lower side along the vertical direction to a state of traveling along the horizontal direction, and is incident on the light receiver 62. The light receiver 62 measures a quantity of received light. The control circuit 9 acquires, as a light quantity signal of the photometry unit 60 to be measured, a quantity of light measured by the light receiver 62.

(Step S202)
Next, the control circuit 9 determines whether or not the measurement of the amount of light for all the photometric units 60 has been completed. If the measurement of the amount of light for all the photometric units 60 has been completed (Yes in step S202), the processing proceeds to step S203. If the measurement of the amount of light has not been completed for all the photometric units 60 (No in step S202), the control circuit 9 conveys the adjustment cuvette 80 along the circumferential direction of the reaction disk 201 by rotating the reaction disk 201 by a predetermined angle. At this time, the slot 2011 located directly below the adjustment light emitter 163 is switched. The control circuit 9 rotates the reaction disk 201 in such a manner that the slot 2011 corresponding to the photometry unit 60 for which a quantity of light has not been measured is moved to a position directly below the adjustment light emitter 163. The control circuit 9 moves, for example, the slot 2011 adjacent to the slot 2011 for which a quantity of light has already been measured to a position directly below the adjustment light emitter 163. Then, the control circuit 9 repeatedly executes the processing in steps S201 and S202 until light quantity adjustment with respect to all of the photometry units 60 is completed.

(Step S203)
Upon completion of light quantity measurement with respect to all of the photometry units 60, the control circuit 9 determines a range of quantities of light (hereinafter, referred to as a reference range), which serves as a reference for light quantity adjustment, based on quantities of light respectively measured by the photometry units 60. The reference range corresponds to, for example, values of quantities of light having a predetermined range centered on an average value of quantities of light of the photometry units 60, acquired in step S202. Instead of the average value, a median value of quantities of light respectively acquired for the photometry units 60 may be used.

(Step S204)
The control circuit 9 adjusts a gain of light emitted from the light receiver 62 of each of the photometry units 60 based on the reference range. At this time, the control circuit 9 adjusts a gain of each of the light receivers 62 in such a manner that each of the quantities of light respectively measured by the light receivers 62 takes on a value within the reference range. By adjusting gains of the receivers 62, variations in measurement accuracy among the plurality of light receivers 62 is suppressed. Thereafter, the control circuit 9 terminates the gain adjustment processing.

Hereinafter, the advantageous effects of the automatic analyzing apparatus 1 according to the present embodiment will be described.

The automatic analyzing apparatus 1 according to the present embodiment includes the reaction disk 201, the photometry units 60, and the control circuit 9. The reaction disk 201 has the plurality of slots 2011 for holding the plurality of adjustment cuvettes 80. The photometry units 60 perform photometry on the solutions respectively contained in the plurality of cuvettes 70. The photometry units 60 have the plurality of light emitters 61 and the plurality of light receivers 62 respectively disposed in the plurality of slots 2011. The control circuit 9 adjusts gains of the plurality of light receivers 62 based on a plurality of light quantity signals from the plurality of light receivers 62 that receive light generated by the single adjustment light emitter 163 and guided by the adjustment cuvettes 80 respectively inserted into the plurality of slots 2011.

With the automatic analyzing apparatus 1 according to the present embodiment configured as described in the above, by using the single adjustment light emitter 163 that emits light to the plurality of adjustment cuvettes 80 and the adjustment cuvettes 80 that guide light emitted from the adjustment light emitter 163 to the plurality of light receivers 62, gain adjustment with respect to the plurality of light receivers 62 can be performed using the single adjustment light emitter 163. This makes it possible to adjust variations among the light receivers 62 regardless of variations among parameters related to the light emitters 61.

As described in the above, with the automatic analyzing apparatus 1 according to the present embodiment, gain adjustment with respect to a large number of light receivers 62 can automatically be performed at the time of shipment of the automatic analyzing apparatus 1 or at the time of maintenance performed against age deterioration. This makes it possible to stabilize the system that performs gain adjustment, improve the accuracy of gain adjustment, and shorten a time required for gain adjustment. Furthermore, this realizes reduction of adjustment man-hours at the time of shipment and maintenance man-hours.

After completion of the gain adjustment processing, quantities of light of the light emitters 61 may be adjusted using the adjusted light receivers 62.

Furthermore, the light quantity adjustment processing described in the first embodiment may be performed using the adjustment cuvettes 80 used in the present embodiment before the gain adjustment processing. In this case, the adjustment cuvette 80 is inserted into the slot 2011 in such a manner that the mirror surface of the mirror 83 faces the light emitter 61, and the light quantity adjustment of the light emitter 61 is performed through the light quantity adjustment processing using the adjustment mechanism 16 having the adjustment light receiver 162. Thereafter, the orientation of the adjustment cuvette 80 is changed in such a manner that the mirror surface of the mirror 83 faces the light receiver 62, and gain adjustment of the light receiver 62 is performed through the gain adjustment processing using the adjustment mechanism 16 having the adjustment light emitter 163.

Modification of Second Embodiment

A modification of the second embodiment will be described. The present modification is a modification of the configuration of the second embodiment as will be described below. In the present modification, the adjustment light emitter 163 is arranged below the reaction disk 201. Descriptions of the configurations, operations, and advantageous effects similar to those of the second embodiment will be omitted.

The present modification omits descriptions of the reaction disk 201 and the adjustment cuvettes 80 because they have the same configurations as those described with reference to FIG. 9 and FIG. 10 in the modification of the first embodiment.

FIG. 13 is a diagram showing an example of the configuration of the adjustment mechanism 16 according to the present modification. The adjustment mechanism 16 is fixed to the analysis mechanism 2. FIG. 13 shows a cross section substantially parallel to the rotation axis R of the reaction disk 201 and substantially parallel to the radial direction centered on the rotation axis R.

In the present modification, in a state in which the adjustment cuvette 80 is inserted into the slot 2011, the mirror 83 is installed in such a manner that the mirror surface faces the side in which the light receiver 62 is arranged and that the mirror surface faces the lower side. The mirror 83 is installed in such a manner that light emitted from the adjustment light emitter 163 arranged below the reaction disk 201 is reflected toward the light receiver 62. The light guide hole 84 is disposed at a position that faces the light receiver 62 and has substantially the same height as the light receiver 62 and the mirror 83 in a state in which the adjustment cuvette 80 is inserted into the slot 2011.

Emitted light L emitted from the adjustment light emitter 163 with the adjustment cuvette 80 being inserted into the slot 2011 enters the inside of the optical path tube 85 from the lower side, passes through the inside of the optical path tube 85, and is reflected off the mirror surface of the mirror 83. At this time, the emitted light L transitions from a state of traveling to the upper side along the vertical direction to a state of traveling along the horizontal direction. The emitted light L reflected off the mirror surface of the mirror 83 passes through the light guide hole 84, protrudes to the outside of the adjustment cuvette 80 and is incident on the light receiver 62. The light receiver 62 detects the received emitted light L and measures a quantity of emitted light L, etc. The light receiver 62 transmits the measured quantity of light to the control circuit 9.

With the automatic analyzing apparatus 1 according to the present modification, as with the second embodiment, by using the single adjustment light emitter 163 that emits light to the plurality of adjustment cuvettes 80 and the adjustment cuvettes 80 that guide light emitted from the adjustment light emitter 163 to the plurality of light receivers 62, gain adjustment with respect to the plurality of light receivers 62 can be performed using the single adjustment light emitter 163. Therefore, the same advantageous effects as in the second embodiment can be attained.

Third Embodiment

Next, the third embodiment will be described. The present embodiment is a modification of the configuration of the first embodiment as will be described below. The present embodiment uses the adjustment cuvettes 80 in which light receivers for adjustment 88 (hereinafter, simply referred to as adjustment light receivers 88) are respectively incorporated, instead of using the adjustment mechanism including the light receivers for adjustment and the cuvettes for adjustment that guide light emitted from the light emitters 61 to the light receivers for adjustment. Descriptions of the configurations, operations, and advantageous effects similar to those of the first embodiment will be omitted.

FIG. 14 is a diagram showing an example of the configuration of the adjustment cuvette 80 according to the present embodiment. FIG. 14 is a diagram showing a cross section of one of the adjustment cuvettes 80 respectively arranged in the slots 2011, in which the cross section is substantially parallel to the rotation axis R of the reaction disk 201 and is substantially parallel to the radial direction centered on the rotation axis R.

Each of the adjustment cuvettes 80 has the body portion 81, the flange 82, the mirror 83, the light guide hole 84, the optical path tube 85, and an adjustment light receiver 88. The present embodiment omits descriptions of the body portion 81, the flange 82, the mirror 83, the light guide hole 84, and the optical path tube 85 because they have the same configurations as those described with reference to FIG. 5 and FIG. 7 in the first embodiment.

The adjustment mechanism 88 is attached to the upper portion of the body portion 81. In a state in which the adjustment cuvette 80 is held in the slot 2011, the adjustment light receiver 88 is positioned above the slot 2011. The adjustment light receiver 88 is a photodetector that receives light generated by the light emitter 61 and guided by the optical path tube 85. Specifically, the adjustment light receiver 88 measures light emitted from the light emitters 61 and passing through the insides of the adjustment cuvettes 80 inserted into the slots 2011. The adjustment light receiver 88 samples the detected light at predetermined time intervals. The predetermined time interval is, for example, a 0.1 second interval. Based on a detection result, the adjustment light receiver 88 measures a quantity of transmitted light, the intensity of transmitted light, the absorbance, etc. The adjustment light receiver 88 is electrically connected to the control circuit 9 via, for example, a connector. The adjustment light receiver 162 transmits the measured quantity of transmitted light, the intensity of transmitted light, the absorbance, etc., to the control circuit 9. The adjustment light receiver 88 may be communicable with the control circuit 9 through wireless communications. The adjustment light receiver 88 is an example of the third light receiver.

Emitted light L emitted from the light emitter 61 with the adjustment cuvette 80 being inserted into the slot 2011 enters the inside of the body portion 81 through the light guide hole 84 and is reflected off the mirror surface of the mirror 83. At this time, the emitted light L transitions from a state of traveling along the horizontal direction to a state of traveling to the upper side along the vertical direction. The emitted light L reflected off the mirror surface of the mirror 83 enters the inside of the optical path tube 85 from the lower side, passes through the inside of the optical path tube 85, and is incident on the adjustment light receiver 88 disposed in the upper portion of the body portion 81. The adjustment light receiver 88 detects the received emitted light L and measures a quantity of emitted light L, etc.

Next, a procedure for adjusting a quantity of light of the light emitter 61 using the automatic analyzing apparatus 1 according to the present embodiment at the time of calibration of the automatic analyzing apparatus 1 will be described. The light quantity adjustment of the light emitter 61 is performed at the time of calibration of the automatic analyzing apparatus 1, for example, at the time of shipment of the automatic analyzing apparatus 1 or at the time of maintenance performed against the age deterioration of the automatic analyzing apparatus 1.

When performing the light quantity adjustment on the light emitters 61, an operator first adjusts the accuracy of the adjustment light receiver 88 disposed in each of the adjustment cuvettes 80. Next, the operator arranges the adjustment cuvettes 80 in the plurality of slots 2011, respectively, as shown in FIG. 6. At this time, the orientation of the adjustment cuvettes 80 is adjusted in such a manner that the mirrors 83 and the light guide holes 84 of the adjustment cuvettes 80 respectively face the light emitters 61. In a state in which the adjustment cuvettes 80 are respectively arranged in the slots 2011, the adjustment light receivers 88 are respectively positioned above the corresponding slots 2011.

Next, the operator inputs an instruction to start the light quantity adjustment processing in the input interface 5. In the present embodiment, the control circuit 9 executes the light quantity adjustment processing, thereby adjusting light quantities of the plurality of light emitters 61 based on light quantity signals from the adjustment light receivers 88 adjusted in accuracy in advance.

The automatic analyzing apparatus 1 according to the present embodiment includes the reaction disk 201, the photometry units 60, and the control circuit 9. The reaction disk 201 has the plurality of slots 2011 for holding the plurality of adjustment cuvettes 80. The photometry units 60 perform photometry on the solutions respectively contained in the plurality of cuvettes 70. The photometry units 60 have the plurality of light emitters 61 and the plurality of light receivers 62 respectively disposed in the plurality of slots 2011. The control circuit 9 adjusts quantities of light of the plurality of light emitters 61 based on a plurality of light quantity signals from the adjustment light receivers 162 respectively disposed in the adjustment cuvettes 80 respectively inserted into the plurality of slots 2011.

With the automatic analyzing apparatus 1 according to the present embodiment, by using the adjustment cuvettes 80 including the adjustment light receivers 88 that receive light emitted from the light emitters 61, the light quantity adjustment with respect to the plurality of light emitters 61 can be performed using the light receivers adjusted in accuracy variation in advance. This makes it possible to adjust variations among the light emitters 61 regardless of variations among parameters related to the light receivers 62. Accordingly, the same advantageous effects as in the first embodiment can be attained without using the configuration such as the adjustment mechanism 16 according to the first embodiment.

Fourth Embodiment

Next, the fourth embodiment will be described. The present embodiment is a modification of the configuration of the second embodiment as will be described below. The present embodiment uses the adjustment cuvettes 80 in which light emitters for adjustment 89 (hereinafter, simply referred to as adjustment light emitters 89) are respectively incorporated, instead of using the adjustment mechanism including the light emitters for adjustment and the cuvettes for adjustment that guide light emitted from the light emitters for adjustment to the light receivers 62. Descriptions of the configurations, operations, and advantageous effects similar to those of the first embodiment will be omitted.

Figure 15:
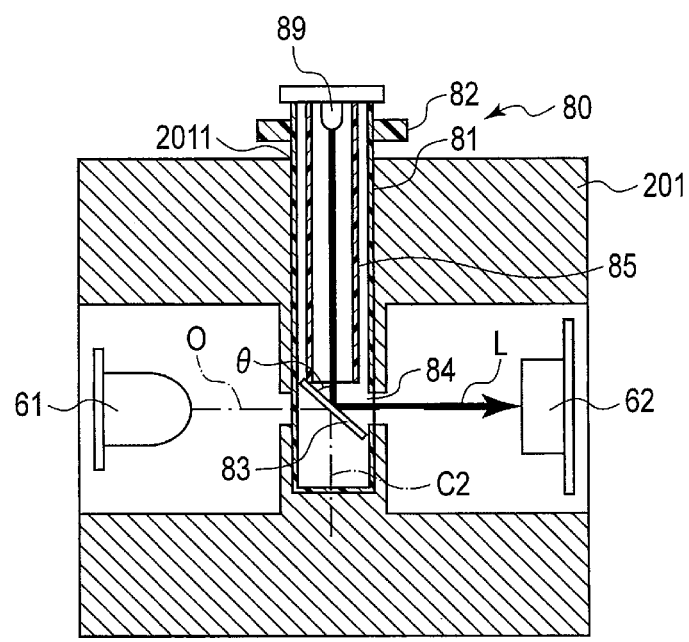
FIG. 15 is a sectional view showing a state in which a jig is held by a holder of an automatic analyzing apparatus according to a fourth embodiment.

FIG. 15 is a diagram showing an example of the configuration of the adjustment cuvette 80 according to the present embodiment. FIG. 15 is a diagram showing a cross section of one of the adjustment cuvettes 80 respectively arranged in the slots 2011, in which the cross section is substantially parallel to the rotation axis R of the reaction disk 201 and is substantially parallel to the radial direction centered on the rotation axis R.

Each of the adjustment cuvettes 80 has the body portion 81, the flange 82, the mirror 83, the light guide hole 84, the optical path tube 85, and the adjustment light emitter 89. The present embodiment omits descriptions of the body portion 81, the flange 82, the mirror 83, the light guide hole 84, and the optical path tube 85 because they have the same configurations as those described with reference to FIG. 5 and FIG. 7 in the first embodiment.

The adjustment light emitter 89 is attached to the upper portion of the body portion 81. The adjustment light emitter 89 is electrically connected to the control circuit 9 via, for example, a connector. The control circuit 9 supplies electric power to the adjustment light emitter 89. The adjustment light emitter 89 is a light source that emits light to the lower side at which the body portion 81 and the optical path tube 85 are arranged. In a state in which the adjustment cuvette 80 is held in the slot 2011, the adjustment light emitter 89 is positioned above the slot 2011. The adjustment light emitter 89 is an example of the third light emitter.

Emitted light L emitted from the adjustment light emitter 89 with the adjustment cuvette 80 being inserted into the slot 2011 enters the inside of the optical path tube 85 from the upper side, passes through the inside of the optical path tube 85, and is reflected off the mirror surface of the mirror 83. At this time, the emitted light L transitions from a state of traveling to the lower side along the vertical direction to a state of traveling along the horizontal direction. The emitted light. L reflected off the mirror surface of the mirror 83 passes through the light guide hole 84 and is incident on the light receiver 62. The light receiver 62 detects the received emitted light L and measures a quantity of emitted light L, etc.

Next, a procedure for performing gain adjustment of the light receiver 62 using the automatic analyzing apparatus 1 according to the present embodiment will be described. The gain adjustment of the light receiver 62 is performed, for example, at the time of shipment of the automatic analyzing apparatus 1 or at the time of maintenance performed against the age deterioration of the automatic analyzing apparatus 1.

When performing the gain adjustment on the light receivers 62, an operator first adjusts the accuracy of the adjustment light emitter 89 disposed in each of the adjustment cuvettes 80. Next, the operator arranges the adjustment cuvettes 80 in the plurality of slots 2011, respectively, as shown in FIG. 6. At this time, the orientation of the adjustment cuvettes 80 is adjusted in such a manner that the mirrors 83 and the light guide holes 84 of the adjustment cuvettes 80 respectively face the light receivers 62. In a state in which the adjustment cuvettes 80 are respectively arranged in the slots 2011, the adjustment light emitters 89 are respectively positioned above the corresponding slots 2011.

Next, the operator inputs an instruction to start the gain adjustment processing in the input interface 5. In the present embodiment, the control circuit 9 executes the gain adjustment processing, thereby adjusting gains of the plurality of light receivers 62 based on light quantity signals received from the light receivers 62 that receive light emitted from the adjustment light emitters 89 adjusted in accuracy in advance.

The automatic analyzing apparatus 1 according to the present embodiment includes the reaction disk 201, the photometry units 60, and the control circuit 9. The reaction disk 201 has the plurality of slots 2011 for holding the plurality of adjustment cuvettes 80. The photometry units 60 perform photometry on the solutions respectively contained in the plurality of cuvettes 70. The photometry units 60 have the plurality of light emitters 61 and the plurality of light receivers 62 respectively disposed in the plurality of slots 2011. The control circuit 9 adjusts gains of the plurality of light receivers 62 based on a plurality of light quantity signals from the light receivers 62 that receive light generated by the adjustment light emitters 89 respectively disposed in the adjustment cuvettes 80 respectively inserted into the plurality of slots 2011.

With the automatic analyzing apparatus 1 according to the present embodiment, by using the adjustment cuvettes 80 that guide light emitted from the adjustment light emitters 89 to the light receivers 62, gain adjustment with respect to the plurality of light receivers 62 can be performed using the light emitters adjusted in accuracy variation in advance. This makes it possible to adjust variations among the light receivers 62 regardless of variations among parameters related to the light emitters 61. Accordingly, the same advantageous effects as in the second embodiment can be attained without using the configuration such as the adjustment mechanism 16 according to the second embodiment.

According to at least one of the above-described embodiments, it is possible to improve the accuracy in light quality adjustment or gain adjustment with respect to the photometry unit.

The term "processor" used herein refers to, for example, a central processing unit (CPU) or a graphics processing unit (GPU), or various types of circuit which may be an application-specific integrated circuit (ASIC), a programmable logic device (such as a simple programmable logic device (SPLD), a complex programmable logic device (CPLD), or a field programmable gate array (EPGA)), and so on. The processor reads and executes programs stored in a memory circuit, thereby implementing the functions. Instead of storing a program in a memory circuit, a program may be directly integrated into a circuit of the processor. In this case, a processor reads and executes a program integrated into a circuit, thereby implementing the functions. The embodiments herein do not limit the processor to a single circuit-type processor. Multiple independent circuits may be combined and integrated as one processor to realize the intended functions. In addition, a plurality of structural elements in FIG. 1 may be integrated in one processor to implement the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An automatic analyzing apparatus, comprising:
   a holder including a plurality of placement portions for a reaction tube to be placed thereon;
   a photometry unit configured to perform photometry on a solution inside the reaction tube, the photometry unit including a plurality of light emitters and a plurality of first light receivers respectively disposed in the plurality of placement portions; and
   processing circuitry configured to adjust quantities of light of the plurality of light emitters based on a light quantity signal from one or more second light receivers that receive light generated by the light emitters and guided by one or more jigs inserted into the placement portions,
   wherein the one or more jigs comprise a plurality of jigs, the one or more second light receivers are arranged below the plurality of jigs held in the placement portions, the plurality of jigs guide light generated by the light emitters to a lower side, and the holder is disposed below the placement portions and includes an optical path tube that guides light guided by the plurality of jigs to the one or more second light receivers.

2. The automatic analyzing apparatus according to claim 1, wherein the one or more second light receivers comprise only a single second light receiver, and the processing circuitry is further configured to adjust quantities of light of the plurality of light emitters based on a plurality of light quantity signals from the single second light receiver that receives light generated by the plurality of light emitters and guided by the plurality of jigs respectively inserted into the plurality of placement portions.

3. The automatic analyzing apparatus according to claim 1, wherein the processing circuitry is further configured to cause the one or more second light receivers to receive a plurality of beams of light respectively generated by the plurality of light emitters by conveying the plurality of jigs respectively held in the holders to the one or more second receivers.

4. The automatic analyzing apparatus according to claim 1, wherein the processing circuitry is further configured to determine a reference range of quantities of light based on an average value or a median value of the plurality of light quantity signals, and adjust quantities of light of the plurality of light emitters in such a manner that each of the quantities of light takes on a value within the reference range.

5. An automatic analyzing apparatus, comprising:
a holder including a plurality of placement portions for a reaction tube to be placed thereon;
a photometry unit configured to perform photometry on a solution inside the reaction tube, the photometry unit including a plurality of light emitters and a plurality of first light receivers respectively disposed in the plurality of placement portions; and
processing circuitry configured to adjust quantities of light of the plurality of light emitters based on a light quantity signal from one or more second light receivers that receive light generated by the light emitters and guided by a plurality of jigs inserted into the placement portions,
wherein the processing circuitry is further configured to cause the one or more second light receivers to receive a plurality of beams of light respectively generated by the plurality of light emitters by conveying the plurality of jigs respectively held in the holders to the second receiver.

6. The automatic analyzing apparatus of claim 5, wherein the one or more second light receivers comprise only a single second light receiver, and the processing circuitry is further configured to adjust quantities of light of the plurality of light emitters based on a plurality of light quantity signals from the single second light receiver that receives light generated by the plurality of light emitters and guided by the plurality of jigs respectively inserted into the plurality of placement portions.

7. The automatic analyzing apparatus of claim 5,
wherein the one or more second light receivers are arranged above the plurality of jigs respectively held in the placement portions, and
the plurality of jigs guide light generated by the light emitters to the one or more second light receivers.

8. The automatic analyzing apparatus of claim 5, wherein the processing circuitry is further configured to determine a reference range of quantities of light based on an average value or a median value of the plurality of light quantity signals, and adjust quantities of light of the plurality of light emitters in such a manner that each of the quantities of light takes on a value within the reference range.

9. An automatic analyzing apparatus, comprising:
a holder including a plurality of placement portions for a reaction tube to be placed thereon;
a photometry unit configured to perform photometry on a solution inside the reaction tube, the photometry unit including a plurality of light emitters and a plurality of first light receivers respectively disposed in the plurality of placement portions; and
processing circuitry configured to adjust quantities of light of the plurality of light emitters based on a light quantity signal from one or more second light receivers that receive light generated by the light emitters and guided by one or more jigs inserted into the placement portions,
wherein the processing circuitry is further configured to determine a reference range of quantities of light based on an average value or a median value of the plurality of light quantity signals, and adjust quantities of light of the plurality of light emitters in such a manner that each of the quantities of light takes on a value within the reference range.

10. The automatic analyzing apparatus of claim 9, wherein the one or more second light receivers comprise only a single second light receiver, the one or more jigs comprise a plurality of jigs, and the processing circuitry is further configured to adjust quantities of light of the plurality of light emitters based on a plurality of light quantity signals from the single second light receiver that receives light generated by the plurality of light emitters and guided by the plurality of jigs respectively inserted into the plurality of placement portions.

11. The automatic analyzing apparatus of claim 9,
wherein the one or more second light receivers are arranged above the plurality of jigs respectively held in the placement portions, and
the plurality of jigs guide light generated by the light emitters to the one or more second light receivers.

* * * * *